US006766634B2

(12) United States Patent
Covington et al.

(10) Patent No.: US 6,766,634 B2
(45) Date of Patent: Jul. 27, 2004

(54) UNLOADER CONTROL FOR A COMBINED COTTON HARVESTER AND MODULE BUILDER AND METHOD OF OPERATION OF THE SAME

(75) Inventors: Michael J. Covington, Bettendrof, IA (US); Dwight D. Lemke, Geneseo, IL (US); Hyppolite Kuissi, Moline, IL (US)

(73) Assignee: Case Corporation, Racine, WI (US)

( * ) Notice: Subject to any disclaimer, the term of this patent is extended or adjusted under 35 U.S.C. 154(b) by 41 days.

(21) Appl. No.: 10/167,157

(22) Filed: Jun. 11, 2002

(65) Prior Publication Data

US 2003/0228894 A1 Dec. 11, 2003

(51) Int. Cl.⁷ .............................................. A01D 75/04
(52) U.S. Cl. ....................................... 56/480; 414/111
(58) Field of Search ......................... 56/474, 475, 476, 56/477, 478, 479, 480, 473.5; 414/111; 460/119

(56) References Cited

U.S. PATENT DOCUMENTS

| | | | |
|---|---|---|---|
| 2,883,036 A | | 4/1959 | Fox et al. ..................... 198/82 |
| 3,209,932 A | * | 10/1965 | Schiltz ....................... 414/491 |
| 3,337,066 A | * | 8/1967 | Reed et al. .................. 414/345 |
| 3,727,777 A | * | 4/1973 | Hanson ....................... 414/400 |
| 3,744,228 A | | 7/1973 | Lundahl ........................ 56/344 |
| 3,749,003 A | * | 7/1973 | Wilkes et al. ................. 100/35 |
| 3,754,388 A | * | 8/1973 | Neely, Jr. ..................... 56/346 |
| 3,828,956 A | | 8/1974 | Dubo .......................... 214/510 |
| 3,842,730 A | | 10/1974 | White et al. ................. 100/245 |
| 3,842,732 A | | 10/1974 | Anderson .................... 100/270 |
| 3,847,072 A | | 11/1974 | Garrison ...................... 100/35 |
| 3,886,719 A | * | 6/1975 | Garrison et al. ............... 56/344 |
| 3,965,660 A | | 6/1976 | Kanengieter et al. .......... 56/344 |
| 4,184,425 A | | 1/1980 | Haney et al. ................ 100/100 |
| 4,553,378 A | * | 11/1985 | Fachini et al. ................ 56/16.6 |
| 4,595,331 A | * | 6/1986 | Thompson et al. ........... 414/347 |
| 4,817,784 A | * | 4/1989 | Judge ...................... 198/781.06 |
| 4,930,297 A | | 6/1990 | Schlueter et al. ............. 56/16.6 |
| 5,058,727 A | | 10/1991 | Jahns et al. .................. 198/460 |
| 5,083,655 A | | 1/1992 | Becker ........................ 198/460 |
| 5,108,250 A | | 4/1992 | Fewin, Jr. et al. ........... 414/528 |
| 5,178,509 A | * | 1/1993 | Webb et al. ................. 414/491 |
| 5,186,308 A | | 2/1993 | Munro ......................... 198/572 |
| 5,192,177 A | | 3/1993 | Cardinal ...................... 414/501 |
| 5,285,887 A | | 2/1994 | Hall ............................ 198/460 |
| 5,318,167 A | | 6/1994 | Bronson et al. ............. 198/577 |
| 5,540,144 A | * | 7/1996 | Schrag et al. ............. 100/188 R |
| 5,584,762 A | | 12/1996 | Buhler et al. ................ 460/119 |
| 6,315,514 B1 | | 11/2001 | Lindsey ....................... 414/491 |
| 6,530,199 B1 | * | 3/2003 | Covington et al. ........... 56/16.6 |
| 6,536,197 B1 | * | 3/2003 | Covington et al. ............. 56/28 |

* cited by examiner

Primary Examiner—Thomas B. Will
Assistant Examiner—Alicia Torres
(74) Attorney, Agent, or Firm—Brant T. Maurer; Rebecca Henkel; John William Stader

(57) ABSTRACT

A control for an unloader of a cotton module builder or other cotton compactor for controlling unloading and loss of uncompacted or loose cotton from the compactor. The unloader includes an unloading element having a first end, an opposite second end, and an intermediate portion located between the ends. A first cotton driver is positioned and operable for moving cotton over a first portion of the unloading element from the chamber to the intermediate location, and a second cotton driver is positioned and operable for moving the cotton over the unloading element from the intermediate location to the second end. The control includes apparatus for selectably operating the first cotton driver in an unloading direction and apparatus operable during operation of the first cotton driver for detecting passage of a trailing end of the module or mass of compacted cotton.

31 Claims, 15 Drawing Sheets

UNLOADER CONTROL FOR A COMBINED COTTON HARVESTER AND MODULE BUILDER AND METHOD OF OPERATION OF THE SAME

TECHNICAL FIELD

This invention relates generally to an unloader control for a combined cotton harvester and module builder, and more particularly, to an unloader control operable for automatically detecting a condition representative of passage of a compacted cotton module from the module builder and controlling and limiting subsequent unloading of loose cotton therefrom, and a method of operation of the control.

BACKGROUND ART

It is well known for a cotton harvester to have a basket for receiving and holding the harvested cotton, and in some instances, apparatus in the basket for compacting the cotton for increasing the basket capacity. Typically, when the basket is full, or it is otherwise desired to unload the basket, the basket is positioned at an appropriate height and a door or gate on one side or end is pivoted outwardly from the basket and the contents are conveyed from the basket over the door or gate by drag chains or the like and unloaded or dumped into a waiting vehicle such as a truck or trailer for transport to another location such as a gin, or into a module builder which is separate from the harvester and operable for compacting the cotton into a densely compacted unitary cotton module. Reference in this regard, Buehler et al. U.S. Pat. No. 5,584,762, issued Dec. 17, 1996 to Case Corporation, which discloses a well known cotton harvester having a basket with a compactor and an unloading door; and Haney et al. U.S. Pat. No. 4,184,425, issued Jan. 22, 1980 to Cotton Machinery Company, Inc., which discloses a typical known separate cotton module builder.

Presently, it is desired to provide the capability to densely compact the harvested cotton into a unitary module on the harvesting machine as the cotton is being harvested, so as to eliminate the intermediate steps of compacting the cotton in a basket of the harvester then transporting either the collected cotton to a module builder or the module builder to the cotton and unloading the cotton into the module builder, and then further compacting the cotton into a cotton module. In the combined harvesting and module building machine, it is preferably desired to compact the cotton periodically in a module building chamber as it is received from the harvesting apparatus. In some instances, when the module is complete, it may still be desirable or necessary to continue harvesting until a row or section of a field is complete. As a result, a significant amount of loose or uncompacted cotton may be present in the module building chamber of the machine. This loose cotton can present a problem, as it will be present in the module building chamber and at least some part of it is likely to be unloaded with the module, which may be undesirable.

Therefore, what is sought is an unloader for a cotton module builder of a combined cotton harvester and module builder, and a control and method for operating the unloader, which effectively and conveniently contains and recovers loose cotton that may pass from a chamber of the module builder as a compacted cotton module is unloaded therefrom, such that the loose cotton is not lost and can be incorporated into a subsequent cotton module, or unloaded at a different time, as desired. The unloader will also have utility for use with the baskets of conventional cotton harvesters.

SUMMARY OF THE INVENTION

According to one preferred aspect of the invention, an unloader control for a cotton module builder or basket which provides many of the desired features discussed above, is disclosed. The preferred unloader includes an unloading element such as a door, gate, or ramp mounted to the module builder, the unloading element having a first end located adjacent to an open end of a cotton compacting chamber of the module builder in position for receiving a cotton module therefrom, an opposite unloading or second end from which the module is unloaded, and an intermediate portion or location between the ends. A first cotton driver is positioned and operable for moving cotton over a first portion of the unloading element from the chamber to the intermediate location, and a second cotton driver is positioned and operable for moving the cotton over the unloading element from the intermediate location to the second end. According to one preferred aspect of the invention, the control includes apparatus for selectably operating the first cotton driver for moving the cotton in an unloading direction over the first unloader portion toward the second portion, and apparatus operable during operation of the first cotton driver for detecting or determining passage of a trailing end of a cotton module or other mass of compacted cotton from the first unloader portion and automatically stopping the operation of the first cotton driver so as to limit loose cotton following the module or compacted mass from passing to the second unloader portion, the control preferably preventing resumption of operation of the first cotton driver in the unloading direction until a predetermined condition is present indicative of return of a substantial amount of any loose cotton on the first unloader portion to the chamber.

According to another preferred aspect of the present invention, the control includes a device positioned and operable for determining passage of a trailing end of a cotton module or other compacted mass of cotton from the first unloader portion or the intermediate location toward the second end of the unloader and changing a condition or state to indicate the passage, and a processor and circuitry for controllably operating the first driver and the second driver, respectively, the processor and the circuitry being operable when the changed condition is present to stop the operation of the first driver for preventing loose cotton on the unloader following the trailing end of the module or mass from moving past the first driver or intermediate location onto the second unloader portion such that loose cotton following the module or compacted mass can be subsequently returned to the compacting chamber, the processor and the circuitry preventing resumption of operation of the first driver in the unloading direction until a predetermined condition indicative of the return of the loose cotton to the chamber is present.

According to another preferred aspect of the invention, the unloader portions comprise components of a door, gate, or ramp arrangement unfoldable from a generally upstanding folded position in at least partially closing relation to an open end of the cotton compacting chamber, to an unfolded position forming a ramp or bridge between the chamber and a surface such as the ground onto which a cotton module or other compacted mass of cotton is to be unloaded, at least the first unloader portion being tiltable downwardly toward the chamber during folding to the folded position so as to return or dump loose cotton present on the unloader into the chamber, the folding comprising an unloading or module complete condition serving as the predetermined condition indicative of the return of the loose cotton to the chamber.

According to another aspect of the invention, the control includes a device positioned and operable for determining presence of a leading end of a cotton module or other compacted mass of cotton at or near the second or unloading end of the unloader and generating a signal indicative of the presence, to allow an operator to begin moving the module builder or other compactor in a direction opposite the unloading direction at a speed corresponding to the speed of the compacted cotton moving along the unloader, to safely unload the compacted cotton from the unloader onto the receiving surface.

Preferred cotton drivers include, but are not limited to, powered drag chains, belts, rollers, and other apparatus operable for moving a cotton module or other relatively dense mass of compacted cotton along an unloader.

DETAILED DESCRIPTION OF THE INVENTION

Figure 1:
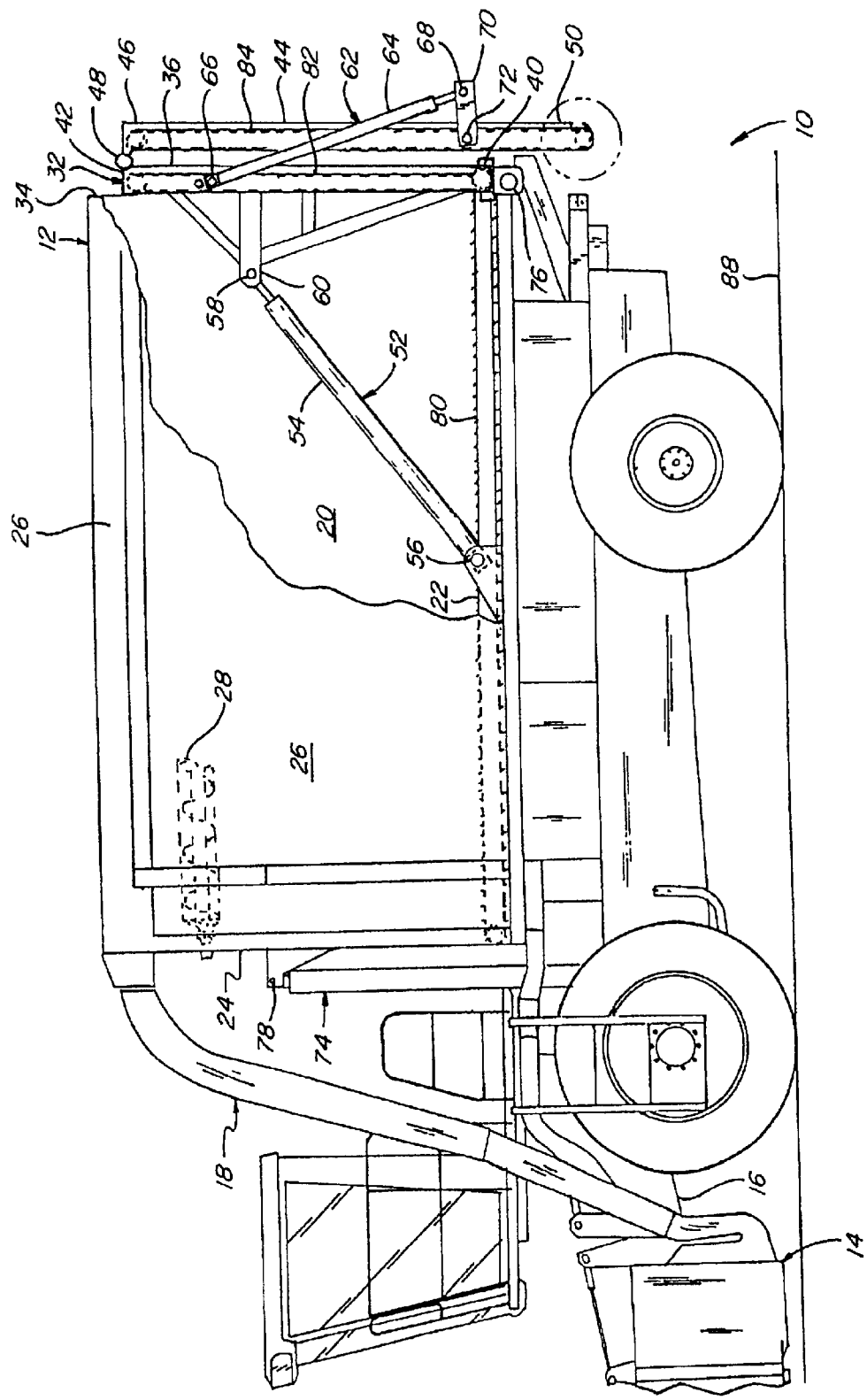
FIG. 1 is a simplified side elevational view of a representative combined cotton harvesting and module building machine including an unloader which includes a foldable door arrangement and an unloader control constructed and operable according to the present invention, the door arrangement being shown in a folded position.
Figure 2:
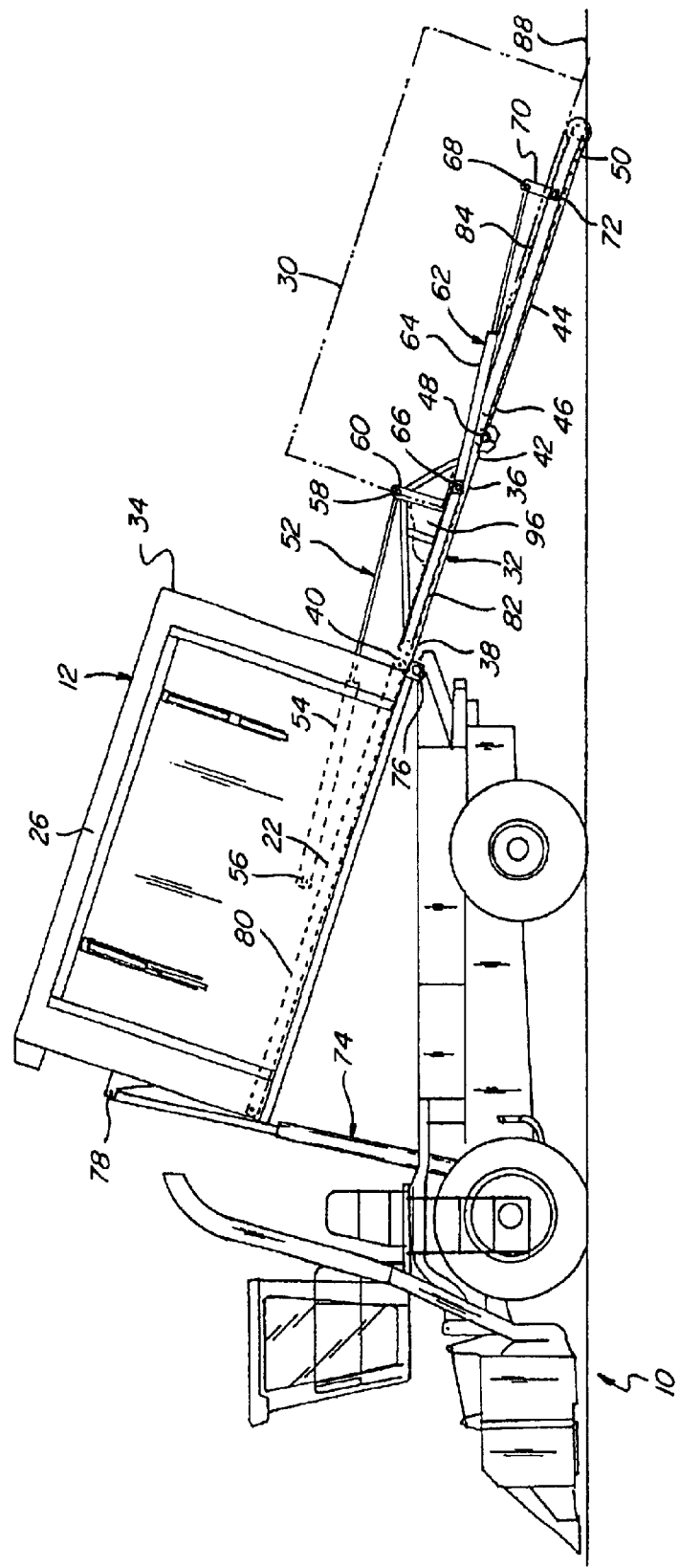
FIG. 2 is another side view of the machine of FIG. 1 showing the module builder tilted to an unloading position and the door arrangement of the unloader in an unfolded position, with a module of compacted cotton and a quantity of loose cotton on the door arrangement shown in phantom.

Referring now to the drawings, in FIGS. 1 and 2, a representative self-propelled mobile cotton harvesting machine 10 is shown, including a cotton module builder 12 for building a cotton module from cotton as it is harvested by machine 10. Cotton harvesting machine 10 includes a plurality of cotton harvesting row units 14 mounted transversely across a forward end 16 of machine 10 in the conventional manner, for removing cotton from cotton plants of a cotton field as machine 10 is driven in a forward direction over the field. After the cotton is removed from the cotton plants by row units 14, the cotton is conveyed through a cotton conveyor structure 18 from the row units 14 to module builder 12. Module builder 12 includes and defines a generally rectangular cotton compacting chamber 20 enclosed at its bottom by a floor 22, at its forward end by a forward wall 24, and on its sides by side walls 26, walls 24 and 26 extending upwardly from floor 22. A cotton compactor 28 is disposed in chamber 20 above floor 22 and is movable upwardly and downwardly toward floor 22 for compacting cotton received in chamber 20 from cotton conveyor structure 18 into a compacted, unitary cotton module 30, illustrated in FIG. 2 in phantom being unloaded from module builder 12.

Importantly, machine 10 includes an unloader 32 constructed and operable according to the present invention for unloading cotton modules such as module 30 from chamber 20, and also for optionally picking up and loading cotton modules into chamber 20. Unloader 32 preferably comprises a folding door arrangement controllably operable for movement between a folded or closed position (FIG. 1) in closing relation to an open rear end 34 of module builder 12, and an unfolded or unloading position (FIG. 2) in concert with tilting of module builder 12, for unloading modules such as module 30, and for optionally picking up cotton modules, as desired.

Unloader 32 includes a primary door segment 36 having a proximal or first end 38 pivotally mounted to machine 10 or module builder 12 adjacent to open rear end 34 by a pivot 40, and a distal or second end 42 opposite first end 38. Primary door segment 36 is pivotally movable between a folded or closed position (FIG. 1) in at least partially closing or covering relation to rear end 34, and an unfolded or open position (FIG. 2) at least substantially parallel to floor 22. Unloader 32 includes a secondary door segment 44 having a proximal end 46 pivotally mounted to second end 42 of primary door segment 36 at an intermediate location between module builder 12 and a free end 50 of secondary door segment 44 by a pivot 48. Secondary door segment 44 is pivotally movable between a folded or closed position in generally side-by-side or overlaying relation to primary door segment 36 (FIG. 1), and an unfolded or unloading position aligned so as to be at least substantially coplanar with and in end-to-end relation to primary door segment 36 and floor 22.

A pair of primary door drivers 52 are pivotally connected between module builder 12 and primary door segment 36, and are operable for pivotally moving primary door segment 36 between the closed or folded position and the open or unfolded position. Primary door drivers 52 each include a fluid cylinder 54 located beside one of the side walls 26 of module builder 12 and pivotally connected at one end by a pivot 56 to module builder 12, and pivotally connected by a pivot 58 to a riser 60 attached to and extending outwardly from primary door segment 36 at a location generally between first end 38 and second end 42. Fluid cylinders 54 are retracted for positioning primary door segment 36 in the closed or folded position, as shown in FIG. 1, and are extended, as shown in FIG. 2, for positioning primary door segment 36 in the open or unfolded position.

Unloader 32 includes a pair of secondary door drivers 62 connected between primary door segment 36 and secondary door segment 44 and operable for pivotally moving secondary door segment 44 between its folded position and its unfolded or unloading position, secondary door drivers 62 each including a fluid cylinder 64 located beside door segments 36 and 44, cylinders 64 each including one end connected by a pivot 66 to door segment 36 and an opposite end pivotally connected by a pivot 68 to one end of a link element 70 pivotally connected at an opposite end by a pivot 72 to door segment 44. As will be explained, link elements 70 importantly are pivotable through a predetermined range of pivotal positions including a position as shown in FIGS. 1 and 2 extending outwardly in at least generally perpendicular relation to door segment 44, and a position generally parallel to door segment 44 (not shown) to facilitate smooth unfolding and folding of door segments 36, 44 of unloader 32.

Here, it should be noted that a compacted cotton module, such as module 30, formed and built within module building chamber 20 by module builder 12 can have a variety of shapes and sizes, as desired or required for a particular application, which shape and size will be primarily defined by the dimensions of chamber 20. Currently, a full cotton module built by a typical known cotton module builder will have width and height dimensions each of about 7 to 8 feet, and a length dimension of about 32 feet. Such cotton modules are typically built by a module builder using cotton harvested by a separate harvesting machine and brought to and deposited in the module builder. In contrast, in the present application, as noted above, module builder 12 is located on and works in conjunction with cotton harvesting machine 10 for producing cotton modules from the cotton as it is being harvested. Cotton fields can be hilly and include irrigation ditches between the rows of cotton plants, as well as naturally made ditches, swales, rivulets and the like, which can present a difficult terrain to be traversed by machine 10 during the harvesting operation. As a result, such that machine 10 is not unduly heavy and unmanageable, and has a size that is not too large and can meet current height and width restrictions on agricultural machines allowed on public roads, chamber 20 is only sufficiently large to produce a cotton module 30 of half the length of the conventional modules discussed above, or about 7 to 8 feet wide by about 7 to 9 feet tall by 16 feet long. A cotton module built by module builder 12 having these dimensions can be expected to weigh as much as 11,000 pounds.

In order to safely unload a cotton module of the above size and weight, it has been found that the unloading apparatus, such as unloader 32, should be oriented at no more than about a 25° angle to a surface lower than module builder 12 onto which the module is to be unloaded. For a cotton harvesting machine with a module building capability such as machine 10, floor 22 of module builder 12 can be expected to be 4 feet or higher above a ground surface on which machine 10 is located and onto which a cotton module is to be deposited. Thus, to provide an inclined path or ramp for unloading the module onto the lower surface at less than about a 25° angle, either a relatively long ramp must be used, or at least the rear end of the module builder lowered to allow using a shorter ramp. In the present instance, which is a preferred version, module builder 12 is not lowered, so unloader 32 is relatively long when unfolded, primary door segment 36 being about 8 feet long, and secondary door segment 44 being about 11 feet long for a combined length of about 19 feet. Here, it should be understood that other sizes and geometries are also contemplated according to the present invention. In regard to the present embodiment, however, it should be appreciated that for a relatively long ramp such as provided by unloader 32, and the significant weight of cotton modules such as module 30 to be conveyed thereover, door segments 36 and 44 by necessity must be of relatively strong construction, and as a result, relatively heavy. Thus, when being unfolded and folded, wherein door segments 36 and 44 are extended in essentially cantilever relation to module builder 12, substantial loading of pivots 40, 48, 56, 58, 66, and 68, as well as fluid cylinders 54 and 64 will be encountered, which loads have been observed to be sufficient to bend cylinders similar to cylinders 54 and 64.

To effect the tilting of module builder 12 to a desired angle of inclination relative to a surface onto which a cotton module is to be unloaded, or from which a cotton module is to be loaded, machine 10 includes at least one and preferably two tilt drivers 74 suitably mounted and located for tilting module builder 12 about a pivot 76 located adjacent to rear end 34. The preferred tilt driver 74 shown in FIGS. 1 and 2 is a conventional fluid cylinder including an upper end connected by a pivot 78 to a forward end of module builder 12 and an opposite end (not shown) pivotally connected to machine 10 beneath the forward end of module builder 12.

To effect forward to rearward movement of a cotton module such as a module 30 from module building chamber 20 and onto primary door segment 36, floor 20 includes at least one cotton driver 80 which preferably is a conventional drag chain operable in a forward to rearward direction for dragging or urging a cotton module within chamber 20 rearwardly, and operable in the opposite direction for moving or urging the module forwardly. Similarly, primary door segment 36 includes at least one cotton driver 82 and secondary door segment 44 includes at least one cotton driver 84, cotton drivers 82 and 84 each also preferably comprising a forwardly and rearwardly operable drag chain. Cotton drivers 80, 82, and 84 are preferably independently operable using conventional hydraulic motors, electric motors, or by connection to an engine of machine 10 or other motive source in any suitable manner.

Figure 3:
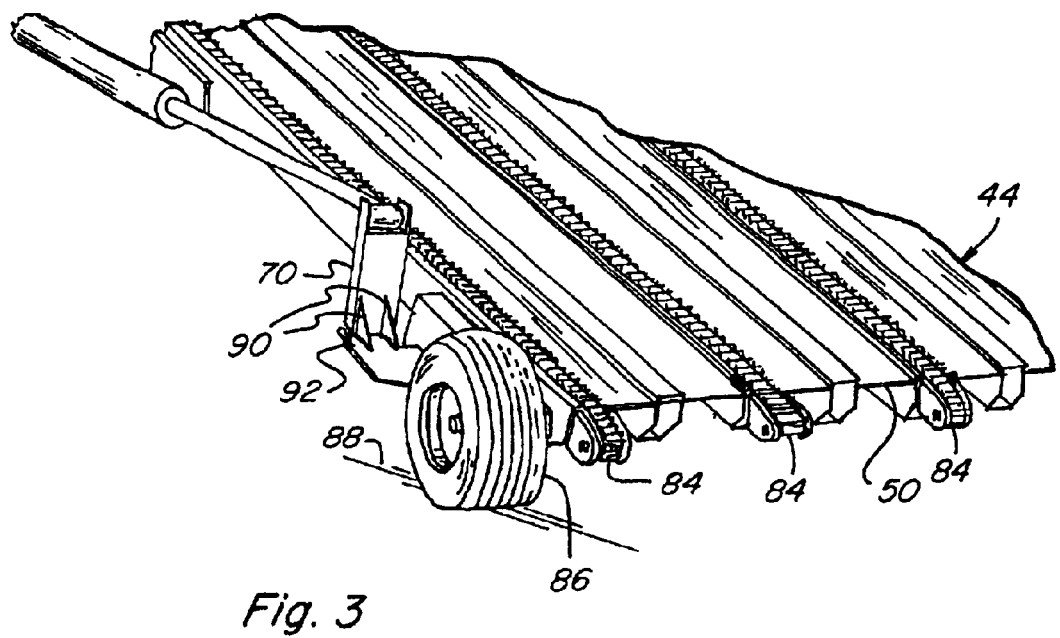
FIG. 3 is a fragmentary perspective view of the unloader showing a representative cotton driver thereof.

Referring to FIG. 3, secondary door segment 44 is shown, including a plurality of spaced drag chains of cotton driver 84, which is representative also of cotton drivers 80 and 82. In this regard, it should be noted that other drivers, such as belts, caterpillars, rollers, and the like may be used as any of drivers 80, 82, and 84. It should also be noted that FIG. 3 shows a wheel 86 mounted to free end 50, for facilitating easy forward and rearward movement of secondary door segment 44 as it is being unfolded and folded, and also as a cotton module is being unloaded from or loaded into cotton module builder 12, and, likewise, that other elements, such as skids, slides, rollers, or the like, could be used to facilitate movement of free end 50 over the ground or another surface 88, as desired. Still further in reference to FIG. 3, it should be noted that pivot stops 90 are provided on secondary door segment 44 for preventing link element 70 from pivoting in the rearward direction beyond the outwardly extending position shown, and similarly, a stop 92 is provided for preventing pivotal movement of the link element in the opposite direction past about parallel to door segment 44, stops 90 and 92 being provided to achieve desired pivotal action of link elements 70 as will be explained.

Figure 4:
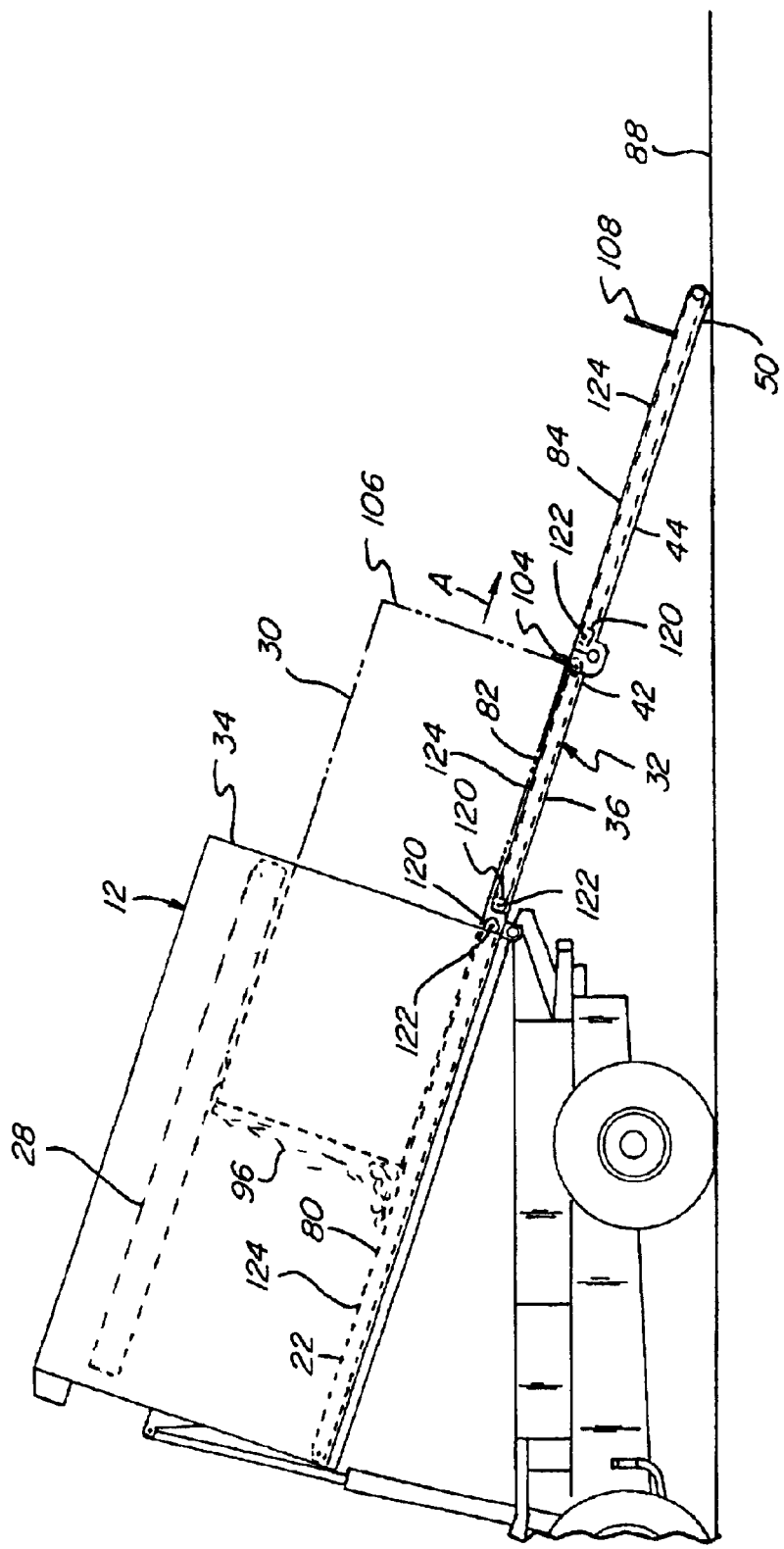
FIG. 4 is a simplified fragmentary side view of the machine of FIG. 1, showing unloading of the cotton module onto the unloader.
Figure 5:
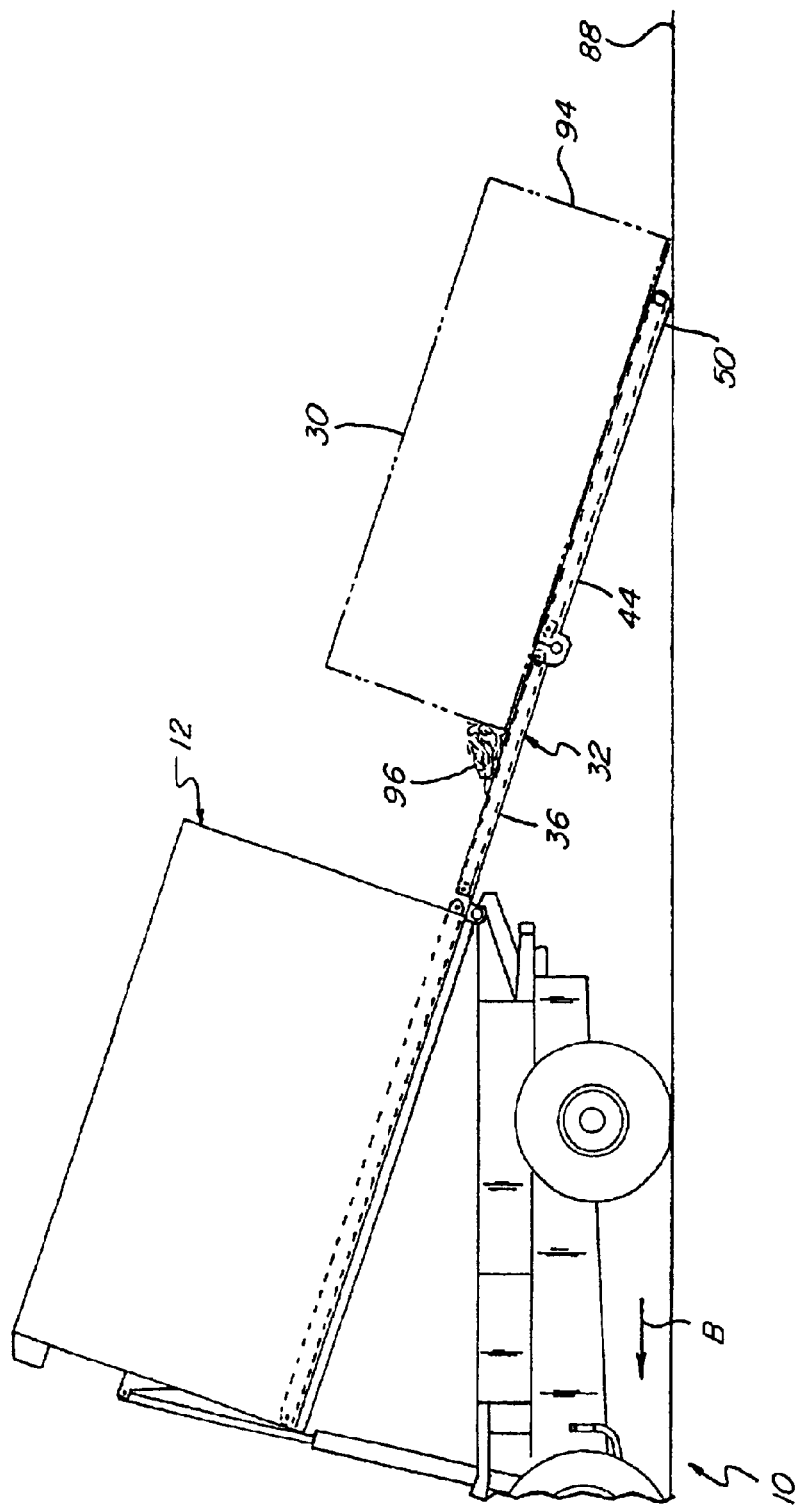
FIG. 5 is another simplified fragmentary side view of the machine of FIG. 1, showing the module in position for being unloaded onto a surface such as the ground and the loose cotton forward of the module.
Figure 6:
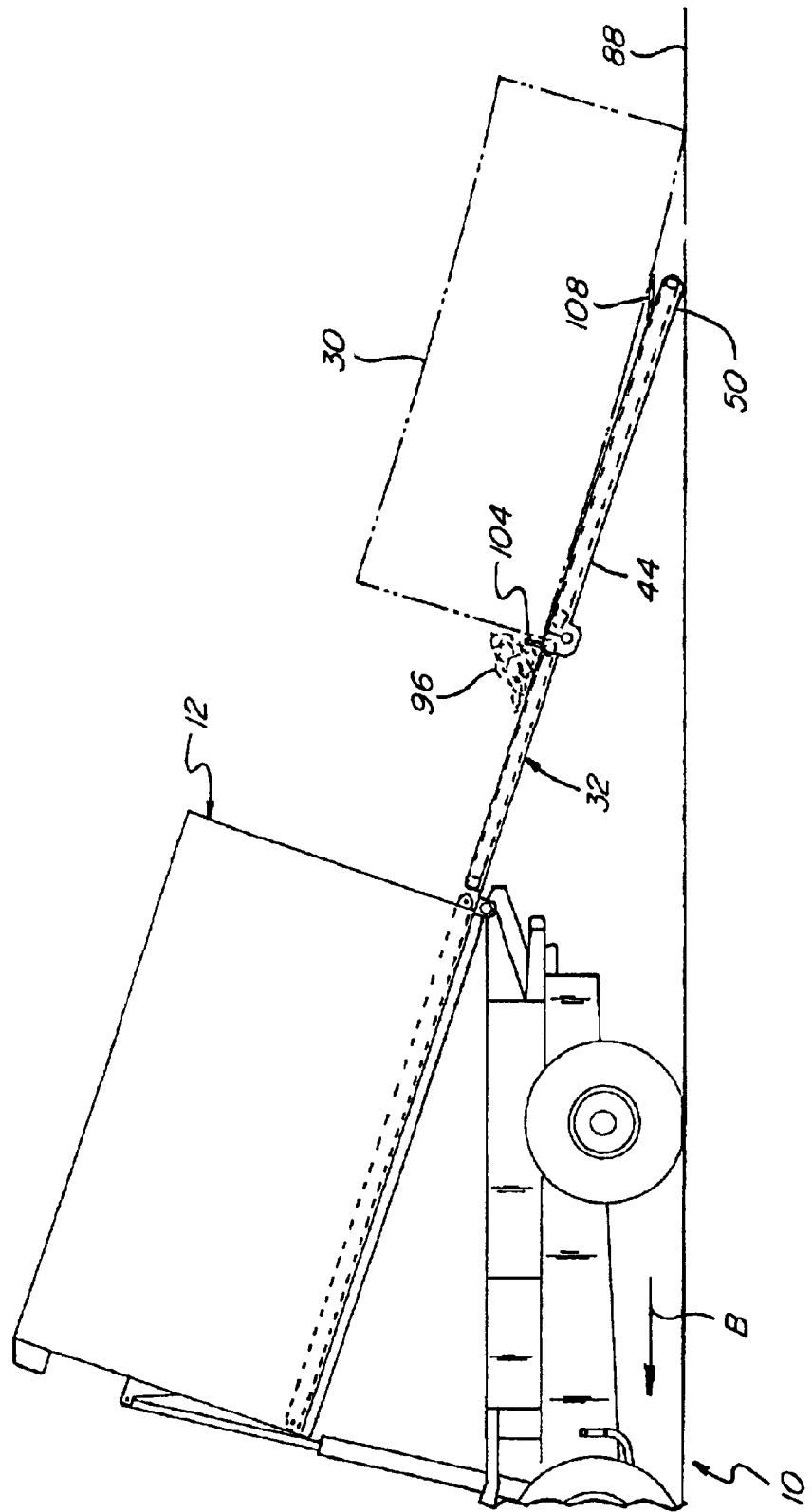
FIG. 6 is another simplified fragmentary side view of the machine of FIG. 1, showing unloading of the module onto the surface and the position of the loose cotton on the unloader.
Figure 7:
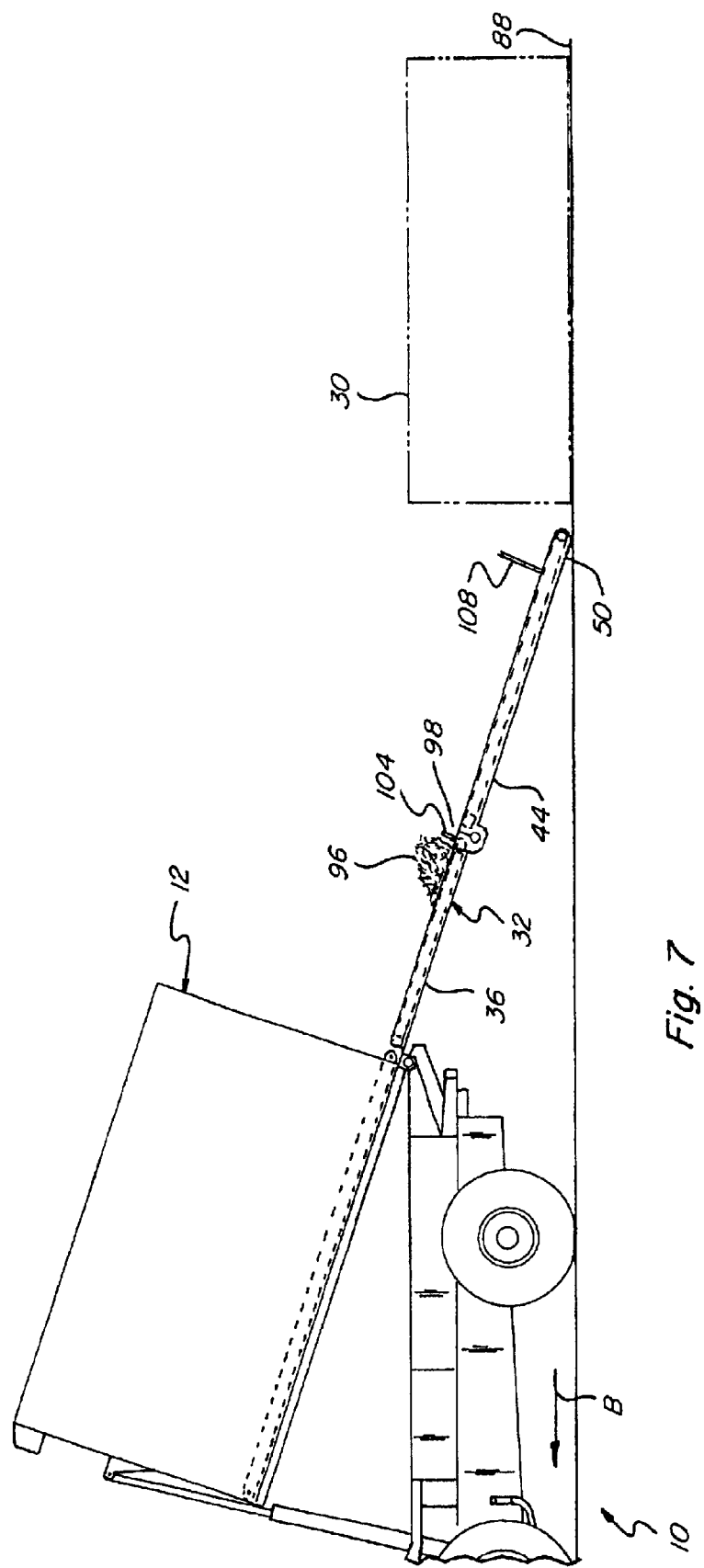
FIG. 7 is another simplified fragmentary side view of the machine showing the module unloaded and the loose cotton remaining on the unloader.

Turning to FIGS. 4–8, preferred steps will be described for the unloading of a cotton module, such as cotton module 30, from chamber 20. Referring to FIG. 4, operation of cotton drivers 80 and 82 is initiated to begin moving module 30 in the rearward direction, denoted by arrow A, through open rear end 34 of module builder 12 to second end 42 of primary door segment 36. At the same time, or when module 30 is nearing or moving onto secondary door segment 44, operation of cotton driver 84 can be initiated. Referring also to FIG. 5, module 30 will then be conveyed along door segments 36 and 44 such that a rear end 94 of module 30 is brought into contact with surface 88. Referring also to FIGS. 6 and 7, at this time, machine 10 is moved in the forward direction, denoted by arrow B, at a speed substantially corresponding to the rearward speed of movement of module 30, such that module 30 is unloaded onto surface 88, without being damaged.

Referring again to FIGS. 4–6, as noted previously, often, when a cotton module is complete, it will be desirable to continue harvesting, to the end of a row or field or section of a field, the thus harvested cotton being allowed to collect in module builder 12 primarily above the module in locations such as spaces between augers or other components of cotton compactor 28, as well as spaces thereabove. When a module such as module 30 is unloaded from module builder 12, at least some of this loose cotton, denoted at 96, will be scraped from the top of the module and will fall therefrom and from cotton compactor 28 onto floor 22 and be carried or moved by cotton drivers 80 from module builder 12 in following or trailing relation to the module being unloaded. Often, it is desired to return the loose cotton to module builder 12 for compaction into a subsequently built module, or for later unloading at another location.

Figure 9:
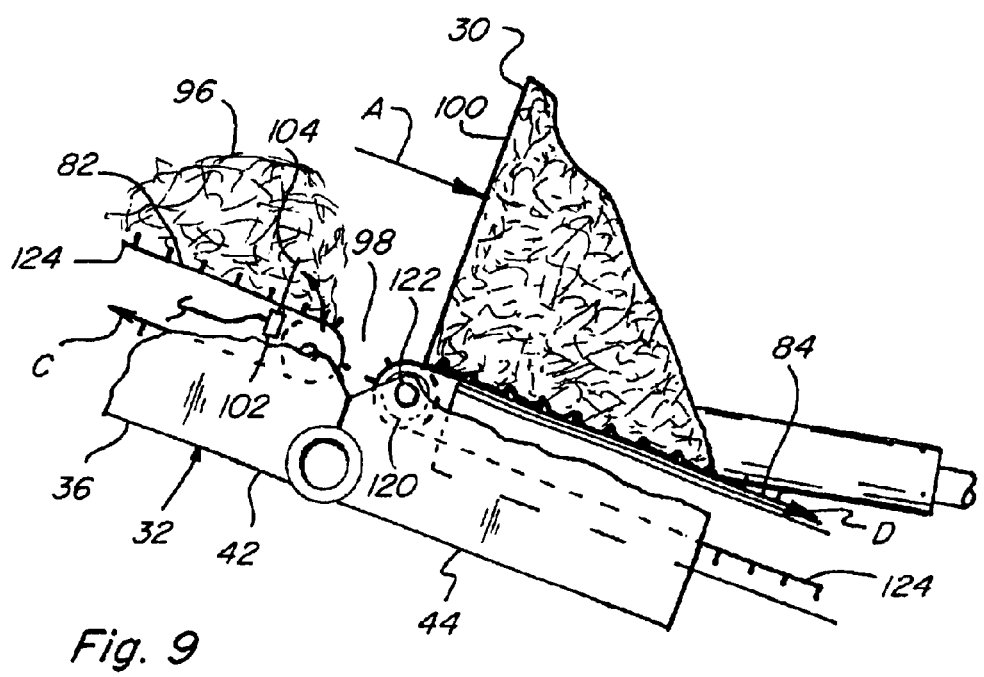
FIG. 9 is a fragmentary side view of the unloader showing apparatus of the unloader control operable during operation of a first cotton driver for detecting passage of a trailing end of a cotton module or mass of compacted cotton from a first surface portion of the unloader.
Figure 8:
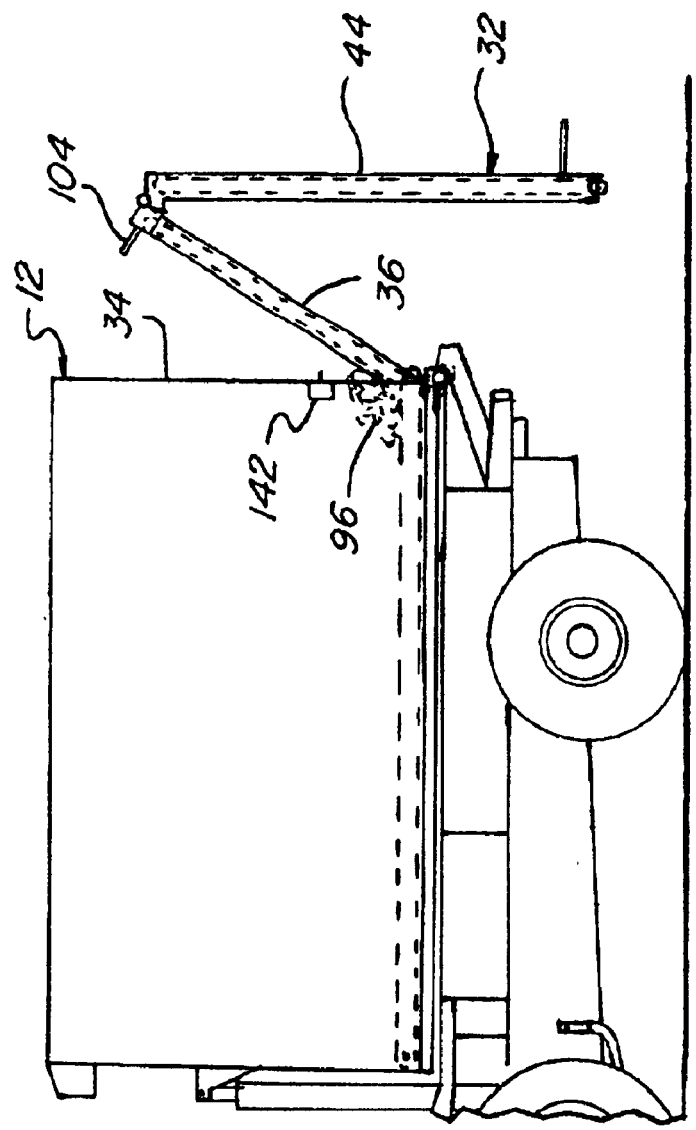
FIG. 8 is another simplified fragmentary side view of the machine showing the folding door arrangement of the unloader in a partially folded position for returning the loose cotton to the module builder.

Also referring to FIGS. 7–9, a preferred manner of returning loose cotton 96 to module builder 12 essentially involves retaining loose cotton 96 on, or preventing passage thereof from, primary door segment 36 over an intermediate location 98 between door segment 36 and secondary door segment 44 to door segment 44 after passage of a module such as module 30 thereto (FIG. 9), then at least partially folding unloader 32 such that door segment 36 is oriented so as to extend downwardly toward open end 34 of module builder 12 such that loose cotton 96 will slide or fall therein. Referring more particularly to FIG. 9, to prevent passage of loose cotton 96 from primary door segment 36 over intermediate location 98 to secondary door segment 44, it is desired to stop the operation of cotton driver 82 just before or at about the time a trailing end 100 of a module such as module 30 passes from door segment 36 or over intermediate location 98, preferably as detected or determined by an apparatus or device 102 suitably positioned and operable for detecting or sensing such passage and changing a state or condition indicative or representative of the same. Suitable preferred devices 102 can include, but are not limited to, a contact switch, an optical detector, a pressure sensor, ultrasonic device, or the like, positioned at a location such as on primary door segment 36 adjacent to second end 42 thereof, as illustrated in FIGS. 4, 6, 7, 8, and 9. Referring to FIG. 9, a preferred device 102 is a contact switch having an upstanding actuator 104 which is deflected in the downward and rearward direction as a module such as module 30 passes thereover, then returns to an upstanding position so as to close or open an electrical circuit when trailing end 100 has passed, thereby providing the state or condition change indicative of such passage. Referring also to FIGS. 4 and 6, it should be observed that both after passage of trailing end 100 past actuator 104 and prior to contact of leading end 106 of a module such as module 30 with actuator 104, the state or condition used to indicate the passage of trailing end 100 will be present, due to the position of actuator 104 in the same upstanding position or orientation or mode. To determine which situation is present, that is, whether trailing end 100 has just passed device 102, or leading end 106 has not yet reached device 102, a second apparatus or device 108 is preferably located adjacent free end 50 of secondary door segment 44 and operable in a suitable manner for changing a state or condition indicative of the presence of a module such as module 30 in the vicinity thereof, which would provide a condition precedent for the state or condition of device 102 indicative of passage of trailing end 100. Suitable devices usable for this purpose can include, but are not limited to, a contact switch, an optical detector, a pressure sensor, an ultrasonic detector, or the like.

Figure 10:
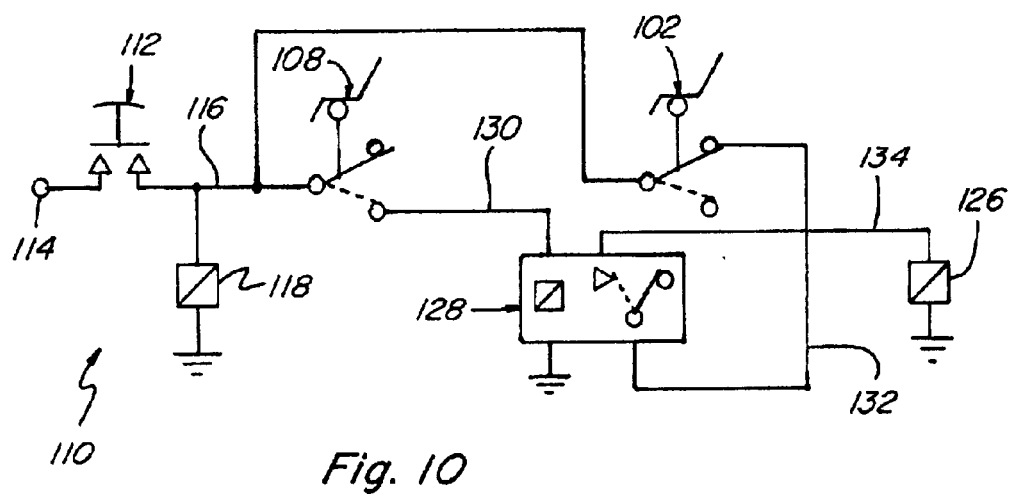
FIG. 10 is a simplified schematic representation of aspects of a preferred control for the unloader of FIGS. 1–9.

Referring also to FIG. 10, a simplified schematic representation of one preferred control 110 for controlling operation of cotton driver 82, and optionally driver 80 also, for allowing passage of a cotton module, such as module 30, past primary door segment 36, but preventing passage of loose cotton 96 therefrom is shown. Control 110 includes schematic representations of devices 102 and 108 depicting those devices as commonly known contact switches which when not in contact with the cotton module will be in the position shown, and when in contact with a module will be switched to a position denoted by the dotted line. Control 110 includes an unloader control switch 112, which can be for instance, a normally open single pole push-button type switch having one contact connected to a direct current power source, denoted at 114, such as the positive terminal of a battery (not shown) of machine 10, a generator, positive bus, or the like. Switch 112 includes another contact connected by a conductive path 116 to a cotton driver operating solenoid 118 and also to input contacts of devices 102 and 108. Referring also to FIGS. 4 and 9, as noted above, each of cotton drivers 80, 82, and 84 includes a source of motive power which is preferably a hydraulic motor 120 connected in driving relation to a transversely extending drive shaft 122 carrying drive sprockets encircled by a drag chain 124, motors 120 being operable for moving drag chains 124 in the directions denoted by arrows C and D (FIG. 9) for moving a module such as module 30 in the unloading direction A. In FIG. 10, control 110 includes another solenoid 126 which when energized disables or disconnects hydraulic motor 120 of cotton driver 82 for selectably deactivating driver 82 when a state or condition indicative of passage of a module such as module 30 from door segment 36 is present. Control 110 includes a relay 128 including a coil connected by a conductive path 130 to an output contact of device 108 so as to receive power and be energized when device 108 is in a second position (shown by a dotted line) as a result of contact with a cotton module. Relay 128 includes an input contact connected by a conductive path 132 to an output contact of device 102 so as to receive power therethrough when device 102 is in its first or normal position (solid line). Relay 108 additionally includes an output contact connected by a conductive path 134 to solenoid 126.

In operation, with modular builder 12 tilted to its unloading position and unloader 32 in its unfolded or unloading position, or optionally to move module builder 12 to its unloading position and unfold unloader 32 then initiate its operation, push-button switch 112 is depressed. This energizes solenoid 118 and connects the input contacts of devices 102 and 108 to power source 114. The energizing of solenoid 118 initiates the operation of cotton driver 80 so as to begin moving a cotton module such as module 30 from module builder 12, and also commences operation of cotton drivers 82 and 84 for subsequently moving the module over door segments 36 and 44. Devices 102 and 108 are also connected to power source 114 and device 102 will connect the input contact of relay 128 to power source 114. Because device 102 is positioned on unloader 32 closer to module builder 12, that device will be contacted by a cotton module such as module 30 prior to device 108 being contacted thereby and will be moved to its second position (dotted line) to thereby change a state or condition and disconnect the input contact of relay 128 from power source 114. Subsequently, device 108 will be contacted by the cotton module and be moved to its second position (dotted line) to energize relay 128 so as to connect the input contact thereof with the output contact thereof (dotted line) thereby connecting conductive paths 132 and 134. However, at this time, due to the smaller distance between devices 102 and 108 on unloader 32 compared to the length of a module such as module 30, devices 102 and 108 will be in their second positions (dotted lines) simultaneously, and because device 102 is in its second position, conductive path 132 will not be connected to conductive path 116 and thus there will be no power to the input contact of input relay 128. Subsequently, when the module passes from door segment 36 and thus breaks contacts with device 102, device 102 will move to its first position (solid line) while device 108 is still in its second position thereby energizing relay 128, such that power will be delivered from power source 114 through conductive path 116, device 102, conductive path 132, relay 128, and conductive path 134 to solenoid 126 to thereby disengage or deactivate cotton driver 82. As a result, after passage of a cotton module therefrom, any loose cotton 96 located on primary door segment 36 will not be moved across intermediate location 98 onto door segment 44. As discussed above, when leading end 106 of a cotton module is close to or in contact with surface 88, it is desired to begin moving machine 10 in the forward direction at a ground speed corresponding to the unloading speed of the module to prevent damage thereto, and device 108 can be connected to a signal device such as a warning light or sound emitter for alerting the operator that it is time to begin moving machine 10 forwardly. In this regard, as another option, the forward speed of machine 10 and the unloading speed of at least cotton driver 84 can be synchronized or matched automatically by a suitable control. To conclude the operation of control 110, the operator will observe when the trailing end of a module being unloaded has left unloader 32 and then will again depress switch 112 to stop operation of cotton drivers 80 and 84. Unloader 32 is then folded to its folded or closed position, such that any loose cotton on door segment 36 will slide or fall back into module builder 12 for later building into a subsequent module for unloading at a desired location. Here, it should be additionally noted that although it is indicated above that solenoid 126 is connected only to cotton driver 82, solenoid 126 could additionally optionally be connected to driver 80, so as to disengage or deactivate that driver when solenoid 126 is energized.

Figure 12:
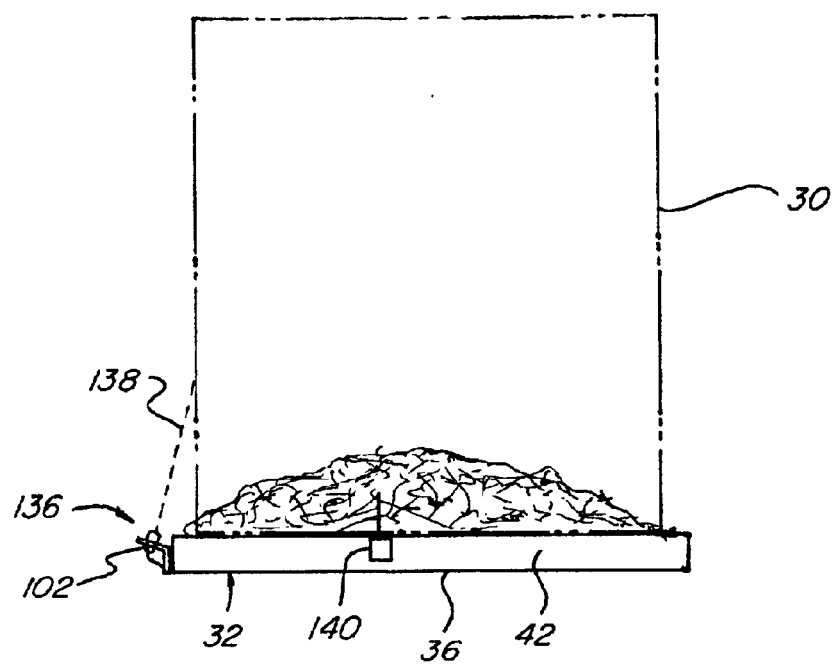
FIG. 12 is a simplified rear view of the unloader showing alternative apparatus of the control operable during operation of a first cotton driver for detecting passage of a trailing end of a cotton module or mass of compacted cotton from a first surface portion of the unloader.
Figure 11:
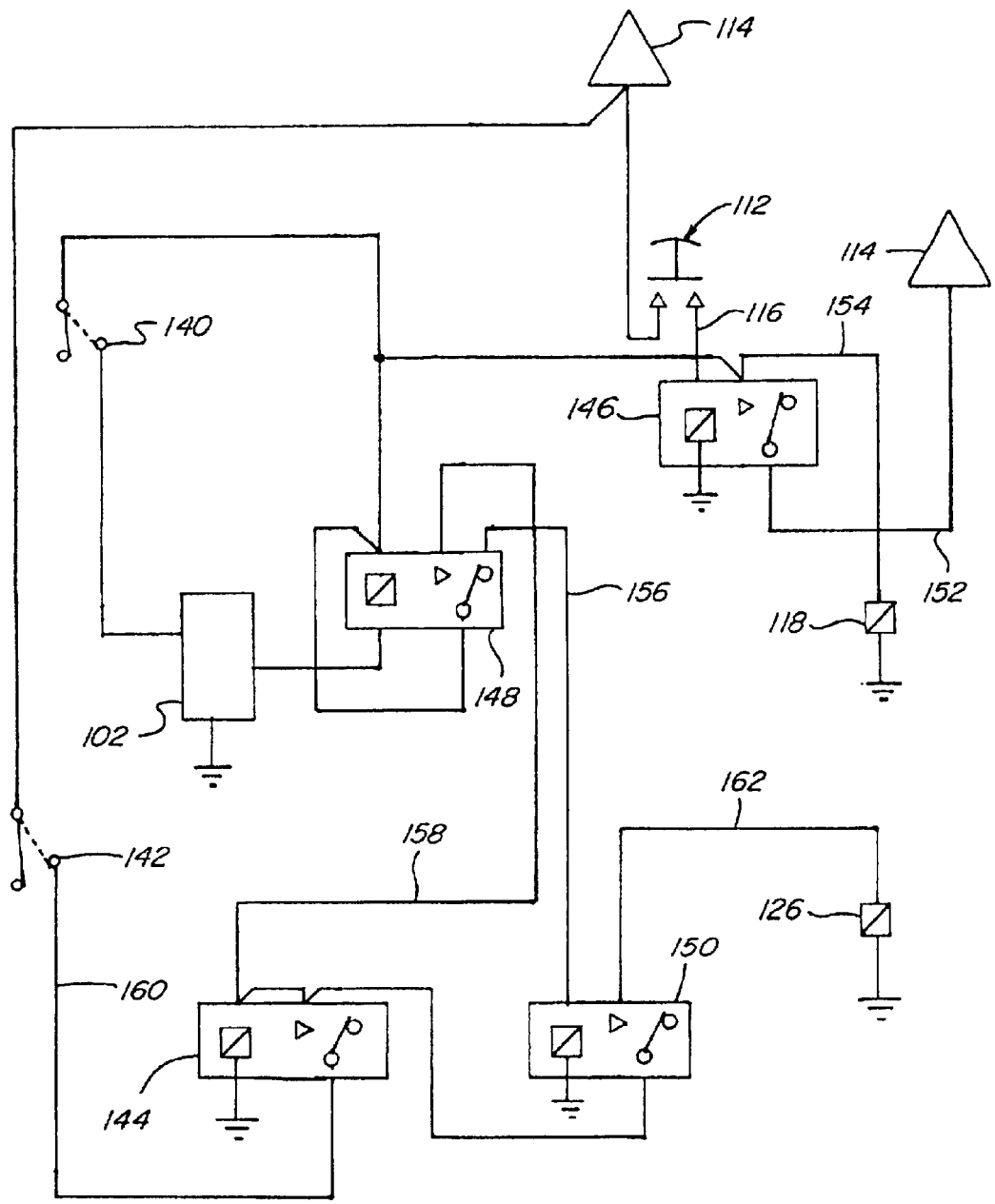
FIG. 11 is a simplified schematic representation of aspects of another preferred control for the unloader.

Referring also to FIGS. 11 and 12, an alternative control 136 constructed and operable according to the present invention for controlling unloader 32 is shown. Control 136 includes a device 102 adjacent second end 42 of primary door segment 36 for determining or detecting the passage of a trailing end of a module such as module 30 therefrom, device 102 being depicted as either an ultrasonic detector, an optical detector or the like, operable for changing a state or condition to represent the passage in the above-described manner. Here, an ultrasonic signal or light beam from a suitable source such as a companion emitter is reflected by module 30 to device 102 as depicted by line 138 such that a state or condition representative of the presence of module 30 will exist. Conversely, in the absence of module 30 from a position for reflecting the signal or beam to device 102 a different state or condition will be present. Alternatively, device 102 could be an optical detector which detects ambient light which is blocked or reduced by a module such as module 30 so as to have or produce different states or conditions depending on the presence or absence of the modules.

Control 136 includes a device 140, which can be a contact switch or other suitable device, also positioned in association with door segment 36 adjacent second end 42 thereof or at another suitable location, device 140 also being operable for determining or detecting the presence or absence of a module such as module 30 in proximity thereto or in contact therewith, device 140 essentially serving to selectably initiate operation of device 102 only when a module is in proximity thereto. This provides some redundancy and also protection against undesired operation of device 102, for instance, due to changing ambient light conditions and other conditions that can effect the light or ultrasonic signals received by device 102. Referring also to FIG. 8, control 136 includes a device 142 that can be, for instance, a contact switch that is in a first position (solid line in FIG. 11) when a motor 32 is in a closed or partially closed position, and a second position (dotted line) when unloader 32 is in the unfolded or unloading position, for supplying power from power source 114 to an input contact of a latching relay 144. Control 136 includes three additional relays 146, 148, and 150. Relay 146 is connected by a conductive path 116 to a contact of switch 112 so as to be energized by power source 114 when switch 112 is closed and includes an input contact connected by a conductive path 152 to power source 114. Relay 146 includes an output contact connected by a conductive path 154 to a cotton driver operating solenoid 118; to an energizing coil and input contact of relay 148; and to an input contact of device 140. Relay 148 includes a first output contact connected by a conductive path 156 to the coil of relay 150, and a second output contact connected by a conductive path 158 connected to the coil of relay 144 and also to an output contact thereof and an input contact of relay 150. Relay 144 includes an input contact connected by a conductive path 160 to an output contact of device 142. Relay 150 includes an output contact connected by a conductive path 162 to solenoid 126.

In operation, when unloader 32 is in its unfolded or unloading position, device 142 will be in its dotted position so as to connect the input contact of relay 144 to power source 114. When switch 112 is depressed, power from power source 114 will energize relay 146 such that conductive path 154 is connected to conductive path 152 and to power source 114 to energize solenoid 118 and commence operation of cotton drivers 80, 82, and 84 to begin moving the cotton module from module builder 12 onto unloader 32. At this time, no cotton will be detected by devices 102 or 140, although power is delivered to the coil of relay 148 and also through relay 148 and conductive path 156 to the coil of relay 150. Also, since the cotton module is not yet detected by devices 102 and 140, the coil of relay 148 is not connected to ground and thus is not energized. When the cotton module has moved along unloader 32 sufficiently to be detected by devices 102 and 140 and thus change the state or condition thereof, the coil of relay 148 will be connected to ground and thus energized to connect conductive path 154 with conductive path 158 through relay 148 so as to energize and latch relay 144 so as to now deliver power from source 114, through device 142 and conductive path 160 to the input contact of relay 150. At this time, however, relay 150 is not energized and thus does not deliver the power to solenoid 126. Then, when the passage of the cotton module from primary door segment 36 is detected by devices 102 and 140, device 102 opens the connection between the coil of relay 148 and ground thereby de-energizing that relay such that conductive path 154 is again connected to conductive path 156 to energize relay 150 to power solenoid 126 and thus disengage cotton driver 82 to prevent movement of cotton from door segment 36 over intermediate location 98 onto door segment 44. Again, as with control 110 discussed above, solenoid 126 can optionally also disengage cotton driver 80. Cotton driver 84 continues to move the cotton module along door segment 44 and onto surface 88 in cooperation with the advancement of machine 10 in the forward direction. Here, it should be noted that control 136 does not require a device 108, but that such a device can optionally be provided to signal the operator when the module is about to contact surface 88 such that the operator can then begin moving machine 10 in the forward direction at a speed corresponding to the unloading speed of the module as discussed above. It should also be noted that once the module has passed devices 102 and 140, relay 148 will remain de-energized until another module is detected, and device 142 will remain in its dotted position, thereby preventing operation of cotton driver 82.

Figure 13:
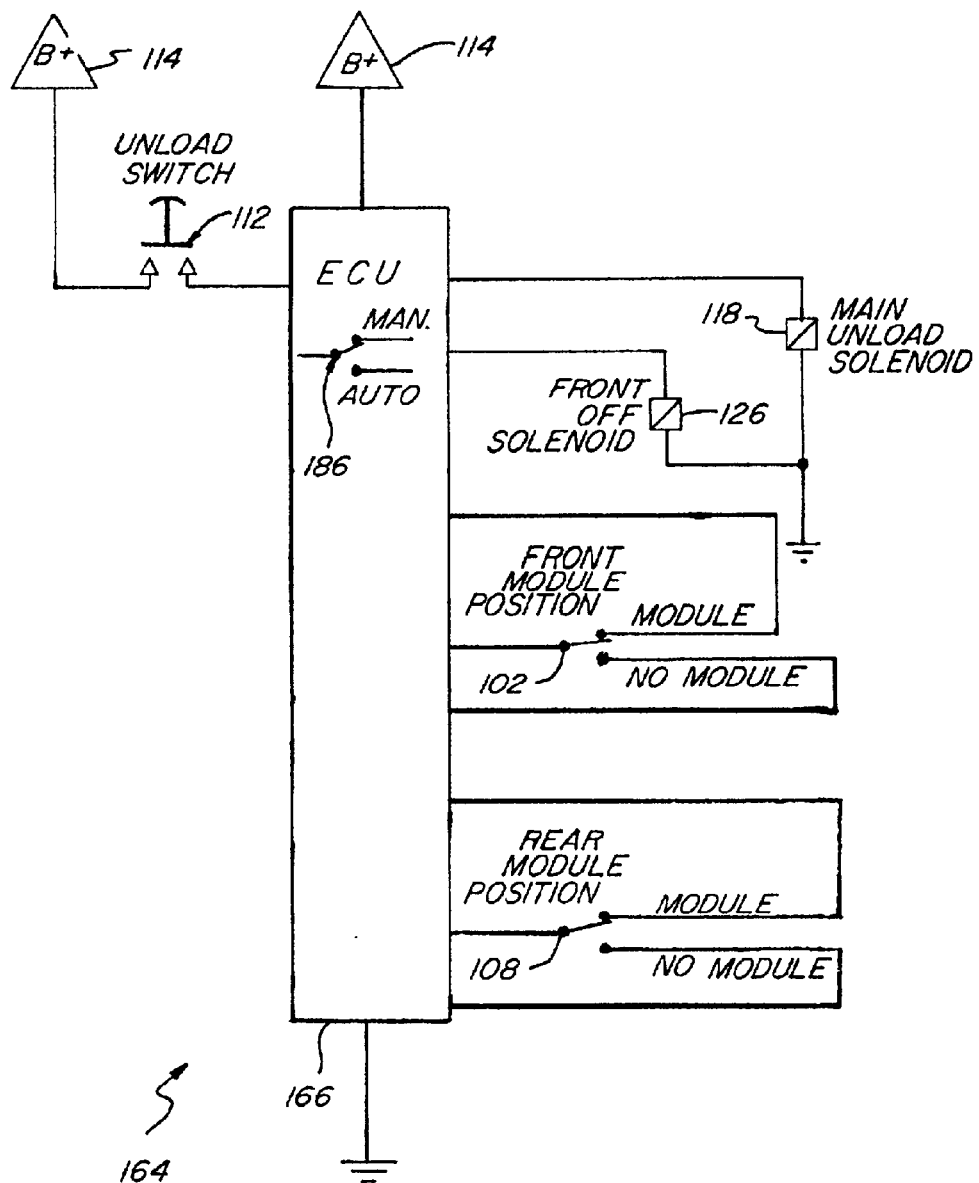
FIG. 13 is a simplified schematic representation of aspects of another preferred control for the unloader.

Referring also to FIG. 13, another alternative control 164 constructed and operable according to the teachings of the present invention for controlling operation of unloader 32 is shown, control 164 being an example of a processor based control. Control 164 includes an electronic control unit 166 (ECU) including the processor, connected to a device 102 located adjacent the second end 42 of primary door segment 36, and a device 108 positioned adjacent free end 50 of door segment 44, each of devices 102 and 108 being operable for detecting or determining the passage of a cotton module such as cotton module 30 and changing a state or condition indicative or representative thereof as explained above. ECU 166 is additionally connected to power source 114 for receiving operating power therefrom when a motor 32 is in its unfolded or unloading position (denoted by B$^+$), and also to power source 114 through a switch 112 which can again be a push-button switch or the like operable for initiating operation of the unloading sequence. ECU 166 is additionally connected to solenoids 118 and 126 for providing power thereto at appropriate times, as will be explained.

Figure 14:
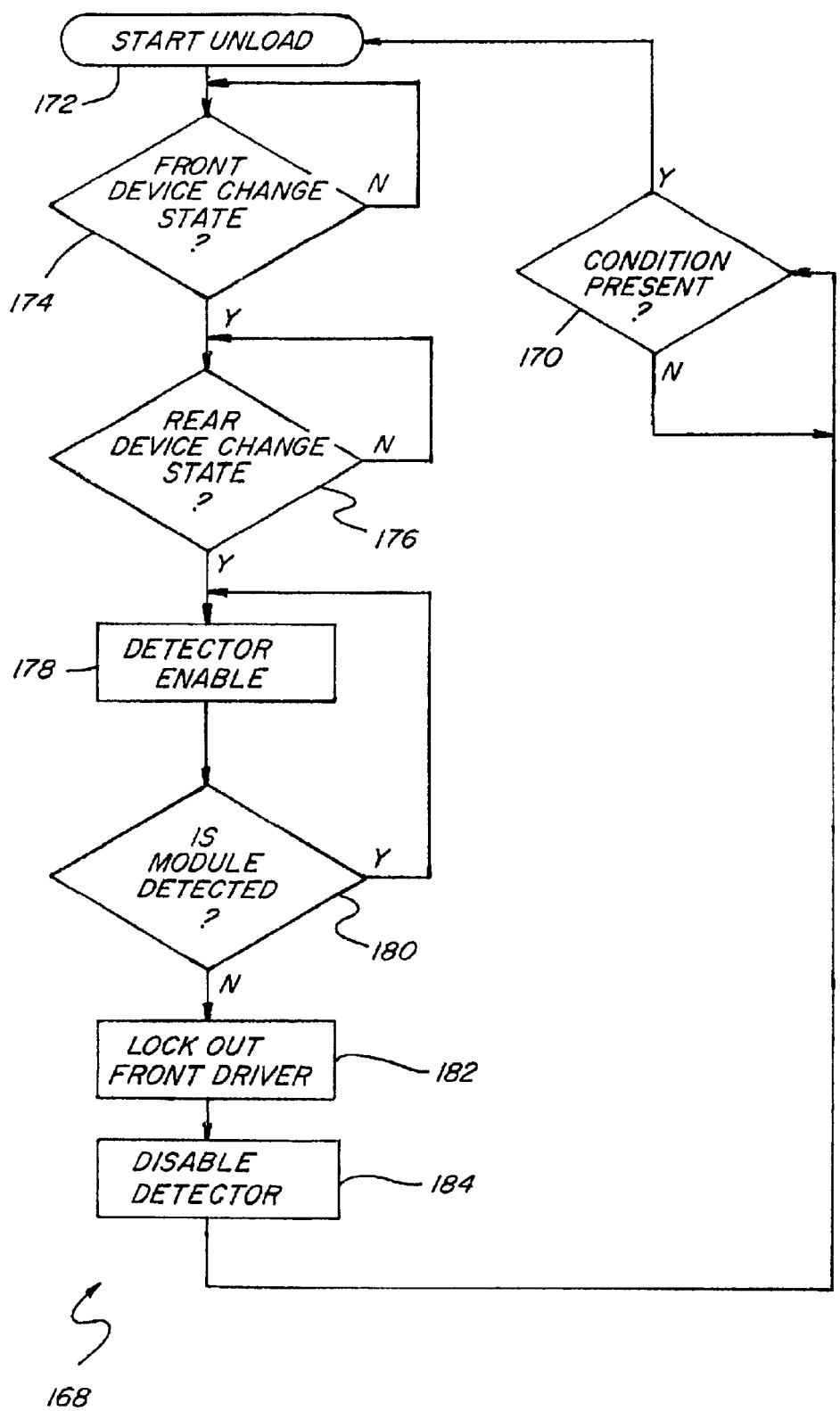
FIG. 14 is a high level flow diagram showing preferred steps of operation of the control of the unloader of FIGS. 1–13.

Turning also to FIG. 14, a diagram 168 is shown to illustrate preferred steps for the operation of control 164. As noted above, it is not desired to allow operation of unloader 32 unless a condition is present indicating that module builder 12 is properly tilted and unloader 32 is unfolded, as represented by decision block 170. If the required condition is present, operation of control 164 can be initiated by depressing or otherwise engaging switch 112 as denoted at block 172. After initiation of the unloading sequence, ECU 166 will await a change of state initiated by device 102 indicating the presence of the cotton module at the location thereof, as denoted by decision block 174. Once the state change indicating presence of the module at device 102 is present, ECU 166 will await the state or condition change from device 108 indicating that the module is now present at that location as denoted by decision block 176. Once device 108 has changed the state or condition indicating that the module is present at that location, device 102 will be enabled to determine the passage of the module from that location, as denoted by block 178. Operation of cotton driver 82 will be allowed to continue, as long as the module is detected at the location of device 102, as denoted by decision block 180. When device 102 no longer detects the presence of the module at that location, ECU 166 will energize solenoid 126 to disengage or lock out cotton driver 82 as denoted at block 182. At the same time, device 102 will be disabled as denoted at block 184. ECU 166 will then continue the unloading sequence to allow unloader 32 to complete the unloading of the module, and operation of device 102 and thus cotton driver 82 will be disabled, until the condition or conditions representative of the return of loose cotton to module builder 12 are present, as represented by decision block 170. Referring again to FIG. 13, it should be noted that ECU 166 can additionally include a device 186 such as a switch or the like which allows selection of operation of ECU 166 in an automatic mode in the above-discussed manner wherein device 102 and driver 82 are automatically rendered inoperable until a condition representative of the return of loose cotton to module builder 12 is present as represented by decision block 170, or a manual mode wherein an operator can selectably operate unloader 32 and/or cotton driver 82 for unloading the module and any loose cotton, as desired.

Figure 15A:
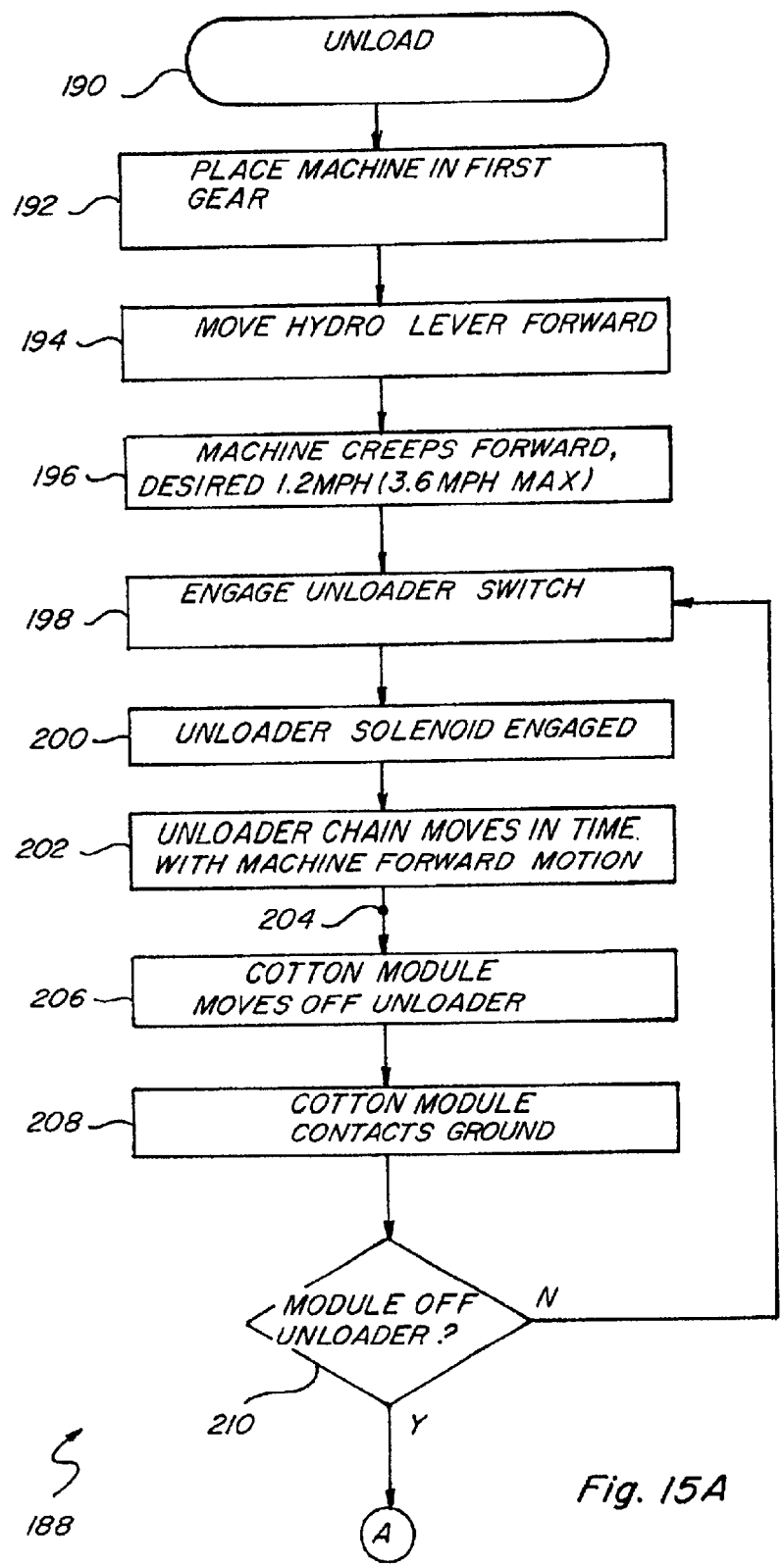
FIG. 15A is a high level flow diagram showing preferred steps of operation of the unloader of FIGS. 1–13.
Figure 15B:
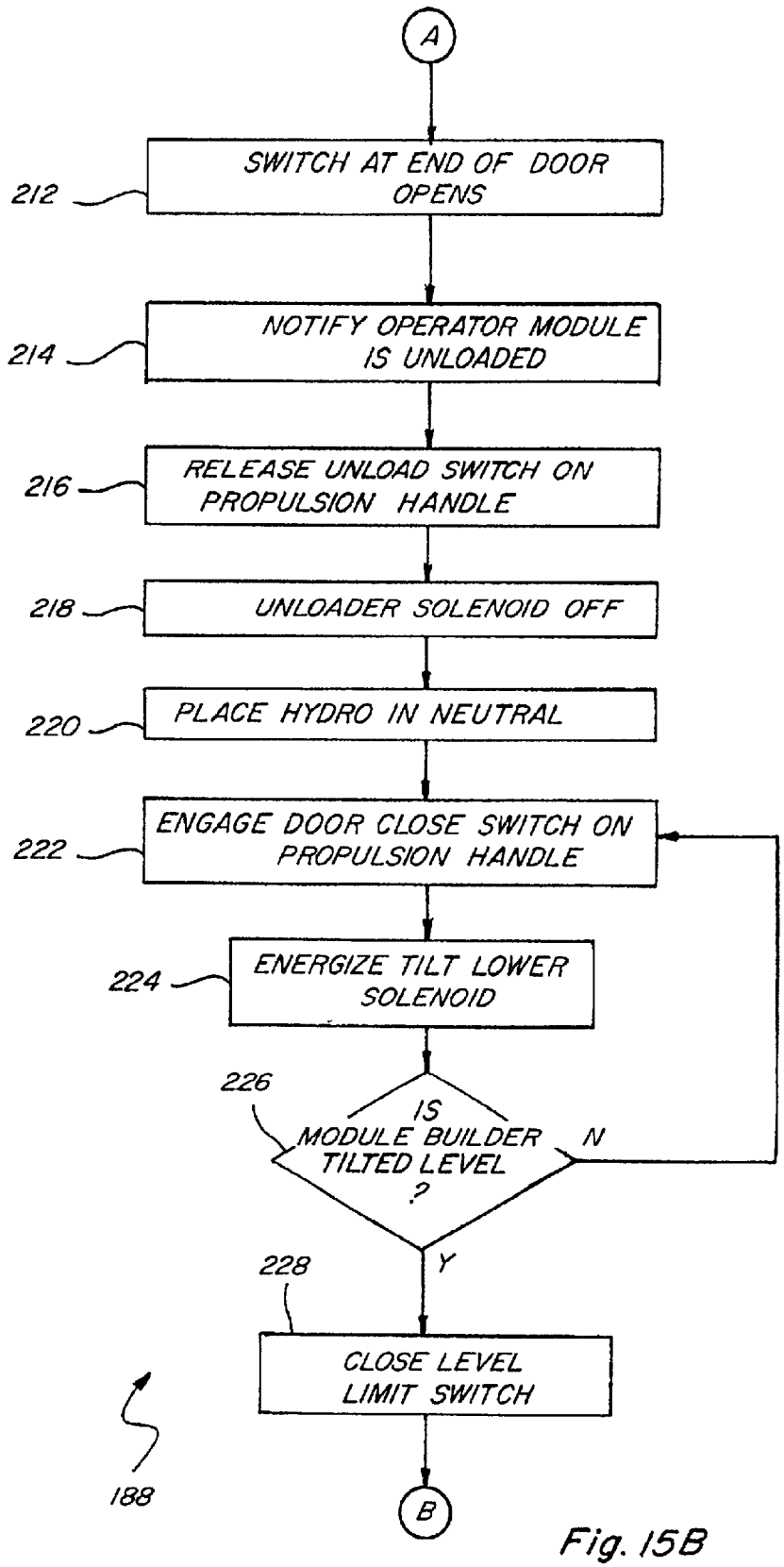
FIG. 15B is a continuation of the high level flow diagram of FIG. 15A.
Figure 15C:
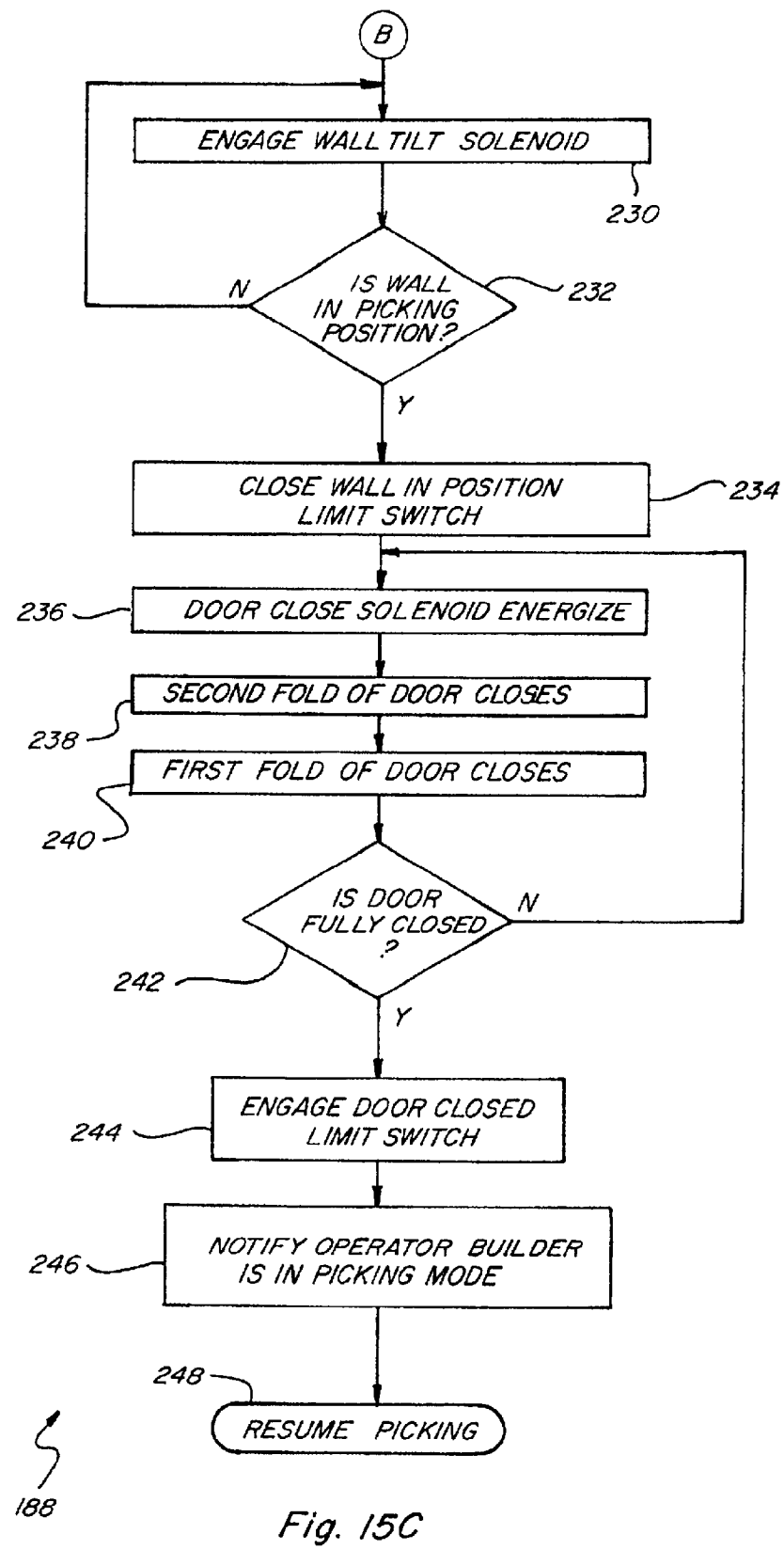
FIG. 15C is a continuation of the high level flow diagram of FIGS. 15A and 15B.

Also referring to FIGS. 15A, 15B, and 15C, as noted above, it is desirable for machine 10 to move forwardly at a speed closely corresponding to the unloading speed of a module as it moves along unloader 32. It is also desirable to have the capability for the operator to operate unloader 32 without leaving the operator cab of machine 10. FIGS. 15A, 15B, and 15C show a high level flow diagram 188 of operating steps for operating unloader 32 from the operator cab of machine 10 and moving machine 10 at a forward speed corresponding to the unloading speed of a module. Referring to FIG. 15A, the unloading sequence is initiated when the operator receives a signal that module builder 12 is ready for unloading as shown by block 190. Typically, when picking cotton, the transmission of machine 10 will be in a gear other than the first or lowest gear. Therefore, the driver should place the machine in first gear, as shown by block 192. The operator can then advance the throttle or hydro lever for moving machine 10 forwardly at a desired speed corresponding to the unloading speed, which will preferably be about 1.2 miles per hour, but which can be as high as 3.6 miles per hour, as denoted at blocks 194 and 196. The operator can then engage unloader switch 112 as denoted at block 198 to supply power to solenoid 118 as denoted at block 200. Here, it should be noted that hydraulic motors 120, and cotton drivers 80, 82 and 84 can be tied to or synchronized with the hydro of machine 10 so as to move in time with the forward motion of machine 10 as denoted in block 202. This moves the cotton module onto the unloader and down the unloader to surface 88. Then, at point 204, referring also to FIG. 14, the steps of diagram 168 are performed, that is, as shown by blocks 174–184, the passage of the module by device 102 is detected and driver 82 disengaged or locked out to retain the loose cotton following the module on primary door segment 36. Referring again to FIG. 15A, at the same time, the cotton module moves off the unloader and contacts the ground as denoted at blocks 206 and 208, and device 108 will indicate the completion of the unloading of the module as denoted by decision block 210.

Referring to FIG. 15B, when the module is off of the unloader, device 108 will open as shown by block 212, and a light or other signal in the operator cab is energized to notify the operator that the module is unloaded as shown at block 214. The operator will then release switch 112 as shown at block 216 to thereby turn off solenoid 118 as shown at block 218 to deactivate drivers 80 and 84. The operator can then place the hydro in neutral to stop the forward movement of machine 10 as shown at block 220. Preferably, a switch will be located on the propulsion handle or elsewhere in the operator cab which can be engaged to fold unloader 32 to the closed or folded position as denoted at block 222. At some time during the folding sequence, a solenoid for operating the tilt drivers for tilting module builder 12 will be energized to lower module builder 12 to the picking position as shown at block 224. A sensor will then detect when the module builder is in the picking position and close a level limit switch, as shown at decision block 226 and block 228.

Referring to FIG. 15C, it is contemplated that one or both of walls 24 will be released at the commencement of the unloading operation, to reduce pressures acting to retain a module in module builder 12 and it is desired to return the wall to its original picking position and generate a signal indicative thereof as denoted at block 230, decision block 232, and block 234. The solenoid controlling closure of unloader 32 is then operated to close or fold unloader 32 to the position of FIG. 1, as denoted by blocks 236, 238, 240, and decision block 242, device 142 or another switch being closed by the closure of the door as denoted at block 244, and then a light or other signal is energized to notify the operator that the machine is now in the picking mode, as denoted at block 246, such that picking can resume, as denoted at block 248.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An unloader for a cotton compacting structure including a cotton compacting chamber, the chamber having a floor therein and an open end, the unloader comprising:

an unloading element mounted to the compacting structure having a first end located adjacent to the open end of the chamber in position for receiving a mass of compacted cotton from the chamber thereon, a second end opposite the first end, a first surface portion extending between the first end and an intermediate location disposed generally between the first and second ends, a second surface portion extending between the intermediate location and the second end, a first cotton driver extending along the first surface portion, and a second cotton driver extending along the second surface portion; and an unloader control, including apparatus for selectably operating the first cotton driver in an unloading direction for moving a mass of compacted cotton over the first surface portion away from the chamber, and apparatus operable during operation of the first cotton driver for detecting passage of a trailing end of a mass of compacted cotton from the first surface portion and automatically stopping the operation of the first cotton driver in the unloading direction so as to limit loose cotton following the mass of compacted cotton on the first surface portion from passing to the second surface portion, the control preventing resumption of operation of the first cotton driver in the unloading direction until a predetermined condition is present indicative of return of a substantial amount of any loose cotton on the first surface portion to the chamber.

2. The unloader of claim 1, wherein the apparatus operable during the operation of the first cotton driver for detecting passage of the trailing end of the mass of compacted cotton from the first surface portion comprises a pressure sensitive device operable for distinguishing between a pressure corresponding to presence of a mass of compacted cotton and a pressure corresponding to presence of loose cotton.

3. The unloader of claim 1, wherein the apparatus operable during operation of the first cotton driver for detecting passage of a trailing end of a mass of compacted cotton from the first surface portion comprises a switch which contacts a mass of compacted cotton when passing from the first surface portion to the second surface portion, the switch changing from a first operating state to a second operating state when contact with the trailing end of the mass of compacted cotton is broken.

4. The unloader of claim 1 wherein the unloader control includes a processor and circuitry connected to the apparatus for operating the first cotton driver and to the apparatus for detecting passage of a trailing end of a mass of compacted cotton, the processor being operable for controlling the apparatus for stopping the operation of the first cotton driver and preventing resumption of operation of the first cotton driver in the unloading direction, and the processor being further operable for controlling the apparatus for operating the first cotton driver to resume the operation thereof when the predetermined condition indicative of return of loose cotton on the first surface portion to the chamber is present.

5. The unloader of claim 1 wherein the first cotton driver comprises a drag chain.

6. The unloader of claim 1 wherein the second cotton driver comprises a drag chain.

7. An unloader for a cotton compacting structure including cotton compacting chamber, the chamber having a floor therein and an open end, the unloader comprising:

an unloading element mounted to the compacting structure having a first end located adjacent to the open end of the chamber in position for receiving a mass of compacted cotton from the chamber thereon, a second end opposite the first end, a first surface portion extending between the first end and an intermediate location disposed generally between the first and second ends, a second surface portion extending between the intermediate location and the second end, a first cotton driver extending along the first surface portion, and a second cotton driver extending along the second surface portion; and an unloader control, including apparatus for selectably operating the first cotton driver in an unloading direction for moving a mass of compacted cotton over the first surface portion away from the chamber, and apparatus operable during operation of the first cotton driver for detecting passage of a trailing end of a mass of compacted cotton from the first surface portion and automatically stopping the operation of the first cotton driver in the unloading direction so as to limit loose cotton following the mass of compacted cotton on the first surface portion from passing to the second surface portion, the control preventing resumption of operation of the first cotton driver in the unloading direction until a predetermined condition is present indicative of return of a substantial amount of any loose cotton on the first surface portion to the chamber, wherein the predetermined condition indicative of return of the loose cotton to the chamber comprises folding at least the first surface portion of the unloading element to a position at least generally facing and tilted downwardly toward the chamber such that a substantial portion of any loose cotton present on the first surface portion will be returned to the chamber.

8. The unloader of claim 7 wherein the control allows resumption of operation of the first cotton driver in the unloading direction after the folding of the unloading element.

9. An unloader for a cotton compacting structure including a cotton compacting chamber, the chamber having a floor therein and an open end, the unloader comprising:

an unloading element mounted to the compacting structure having a first end located adjacent to the open end of the chamber in position for receiving a mass of compacted cotton from the chamber thereon, a second end opposite the first end, a first surface portion extending between the first end and an intermediate location disposed generally between the first and second ends, a second surface portion extending between the intermediate location and the second end, a first cotton driver extending along the first surface portion, and a second cotton driver extending along the second surface portion; and an unloader control, including apparatus for selectably operating the first cotton driver in an unloading direction for moving a mass of compacted cotton over the first surface portion away from the chamber, and apparatus operable during operation of the first cotton driver for detecting passage of a trailing end of a mass of compacted cotton from the first surface portion and automatically stopping the operation of the first cotton driver in the unloading direction so as to limit loose cotton following the mass of compacted cotton on the first surface portion from passing to the second surface portion, the control preventing resumption of operation of the first cotton driver in the unloading direction until a predetermined condition is present indicative of return of a substantial amount of any loose cotton on the first surface portion to the chamber, wherein the apparatus operable during operation of the first cotton driver for detecting passage of the trailing end of a mass of compacted cotton from the first surface portion comprises an optical detector positioned and oriented for detecting the presence or absence of an object having a height which is at least about equal to a predetermined height of a mass of compacted cotton and greater than an expected height of loose cotton.

10. An unloader for a cotton compacting structure including a cotton compacting chamber, the chamber having a floor therein and an open end, the unloader comprising:

an unloading element mounted to the compacting structure having a first end located adjacent to the open end of the chamber in position for receiving a mass of compacted cotton from the chamber thereon, a second end opposite the first end, a first surface portion extending between the first end and an intermediate location disposed generally between the first and second ends, a second surface portion extending between the intermediate location and the second end, a first cotton driver extending alone the first surface portion, and a second cotton driver extending along the second surface portion; and an unloader control, including apparatus for selectably operating the first cotton driver in an unloading direction for moving a mass of compacted cotton over the first surface portion away from the chamber, and apparatus operable during operation of the first cotton driver for detecting passage of a trailing end of a mass of compacted cotton from the first surface portion and automatically stopping the operation of the first cotton driver in the unloading direction so as to limit loose cotton following the mass of compacted cotton on the first surface portion from passing to the second surface portion, the control preventing resumption of operation of the first cotton driver in the unloading direction until a predetermined condition is present indicative of return of a substantial amount of any loose cotton on the first surface portion to the chamber, wherein the unloader control further includes apparatus operable during the operation of the second cotton driver for detecting presence of a leading end of a mass of compacted cotton at or near an end of the second surface portion opposite the first surface portion and changing a condition serving as a signal to an operator to move the cotton compactor in a direction for unloading the mass of compacted cotton from the second surface portion.

11. An unloader for a cotton compacting structure including a cotton compacting chamber, the chamber having a floor therein and an open end, the unloader comprising:

an unloading element mounted to the compacting structure having a first end located adjacent to the open end of the chamber in position for receiving a mass of compacted cotton from the chamber thereon, a second end opposite the first end, a first surface portion extending between the first end and an intermediate location disposed generally between the first and second ends, a second surface portion extending between the intermediate location and the second end, a first cotton driver extending along the first surface portion, and a second cotton driver extending along the second surface portion; and an unloader control, including apparatus for selectably operating the first cotton driver in an unloading direction for moving a mass of compacted cotton over the first surface portion away from the chamber, and apparatus operable during operation of the first cotton driver for detecting passage of a trailing end of a mass of compacted cotton from the first surface portion and automatically stopping the operation of the first cotton driver in the unloading direction so as to limit loose cotton following the mass of compacted cotton on the first surface portion from passing to the second surface portion, the control preventing resumption of operation of the first cotton driver in the unloading direction until a predetermined condition is present indicative of return of a substantial amount of any loose cotton on the first surface portion to the chamber, wherein the unloader control includes a processor and circuitry connected to the apparatus for operating the first cotton driver and to the apparatus for detecting passage of a trailing end of a mass of compacted cotton, the processor being operable for controlling the apparatus for stopping the operation of the first cotton driver and preventing resumption of operation of the first cotton driver in the unloading direction, and the processor being further operable for controlling the apparatus for operating the first cotton driver to resume the operation thereof when the predetermined condition indicative of return of loose cotton on the first surface portion to the chamber is present, and wherein the predetermined condition comprises movement of at least the first surface portion to a position for dumping any loose cotton thereon into the chamber.

12. An unloader for a cotton compacting structure including a cotton compacting chamber, the chamber having a floor therein and an open end, the unloader comprising:

an unloading element mounted to the compacting structure having a first end located adjacent to the open end of the chamber in position for receiving a mass of compacted cotton from the chamber thereon, a second end opposite the first end, a first surface portion extending between the first end and an intermediate location disposed generally between the first and second ends, a second surface portion extending between the intermediate location and the second end, a first cotton driver extending along the first surface portion, and a second cotton driver extending along the second surface portion; and an unloader control, including apparatus for selectably operating the first cotton driver in an unloading direction for moving a mass of compacted cotton over the first surface portion away from the chamber, and apparatus operable during operation of the first cotton driver for detecting passage of a trailing end of a mass of compacted cotton from the first surface portion and automatically stopping the operation of the first cotton driver in the unloading direction so as to limit loose cotton following the mass of compacted cotton on the first surface portion from passing to the second surface portion, the control preventing resumption of operation of the first cotton driver in the unloading direction until a predetermined condition is present indicative of return of a substantial amount of any loose cotton on the first surface portion to the chamber, wherein the unloader control includes a processor and circuitry connected to the apparatus for operating the first cotton driver and to the apparatus for detecting passage of a trailing end of a mass of compacted cotton, the processor being operable for controlling the apparatus for stopping the operation of the first cotton driver and preventing resumption of operation of the first cotton driver in the unloading direction, and the processor being further operable for controlling the apparatus for operating the first cotton driver to resume the operation thereof when the predetermined condition indicative of return of loose cotton on the first surface portion to the chamber is present, and wherein the unloading element comprises a foldable door arrangement and the predetermined condition is present when the door arrangement is in a folded position in at least partially closing relation to the cotton compacting chamber.

13. A control for an unloader of a cotton compacting apparatus, comprising:

a first driver controllably operable for moving a compacted mass of cotton from the cotton compacting apparatus over a surface of the unloader to a first location spaced from the apparatus;

a second driver controllably operable for moving the compacted mass of cotton from the first location to an end of the unloader opposite the apparatus;

a device positioned and operable for determining passage of a trailing end of the compacted mass from the first location toward the end of the unloader and changing a condition to indicate the passage; and a processor and circuitry for controllably operating the first driver and the second driver, respectively, the processor and the circuitry being operable when the changed condition is present to stop the operation of the first driver for preventing loose cotton on the unloader adjacent the trailing end of the compacted mass from moving past the first location such that the loose cotton can be subsequently returned to the apparatus, the processor and the circuitry preventing resumption of operation of the first driver until a predetermined condition indicative of the return of the loose cotton to the apparatus is present.

14. The control of claim 13 wherein the device positioned and operable for determining passage of the trailing end of the compacted mass from the first location toward the end of the unloader and changing a condition to indicate the passage comprises a contact switch.

15. The control of claim 13 wherein the device positioned and operable for determining passage of the trailing end of the compacted mass from the first location toward the end of the unloader and changing a condition to indicate the passage comprises an optical detector.

16. The control of claim 13 further comprising a device positioned and operable for determining presence of a leading end of the compacted mass at or near the end of the unloader and generating a signal indicative of the presence.

17. The control of claim 13 wherein the device positioned and operable for determining passage of a trailing end of the compacted mass from the first location and changing a condition to indicate the passage comprises a device operable for counting an elapsed time of operation of the first driver or a number of rotations of the first driver.

18. A method of operation of an unloader for removing a compacted mass of cotton from a cotton compacting apparatus, comprising the steps of:

providing a first driver controllably operable for moving a compacted mass of cotton from the apparatus over the surface of the unloader to a first location spaced from the apparatus;

providing a second driver controllably operable for moving the compacted mass of cotton from the first location to an end of the unloader opposite the apparatus;

providing a device positioned and operable for determining when the compacted mass of cotton has passed from the first location and changing a predetermined condition representative thereof; and when the changed predetermined condition is present, stopping the operation of the first driver to limit movement by the first driver of loose cotton from the apparatus past the first location while allowing operation of the second driver, and preventing resumption of the operation of the first driver for moving cotton away from the apparatus until a predetermined condition representative of return of loose cotton present on the unloader to the apparatus is present.

19. A method of operation of an unloader for removing a compacted mass of cotton from a cotton compacting apparatus, comprising the steps of:

providing a first driver controllably operable for moving a compacted mass of cotton from the apparatus over the surface of the unloader to a first location spaced from the apparatus;

providing a second driver controllably operable for moving the compacted mass of cotton from the first location to an end of the unloader opposite the apparatus;

providing a device positioned and operable for determining when the compacted mass of cotton has passed from the first location and changing a predetermined condition representative thereof; and when the changed predetermined condition is present, stopping the operation of the first driver to limit movement by the first driver of loose cotton from the apparatus vast the first location while allowing operation of the second driver, and preventing resumption of the operation of the first driver for moving cotton away from the apparatus until a predetermined condition representative of return of loose cotton present on the unloader to the apparatus is present, wherein the unloader is foldable from an unloading position to a folded position in at least partially closing relation to an open end of the cotton compacting apparatus, and the folding to the folded position comprises the predetermined condition representative of the return of loose cotton present on the unloader to the apparatus.

20. An unloader for a cotton compacting structure including a cotton compacting chamber, the chamber having a floor therein and an open end, the unloader comprising:

an unloading element mounted to the compacting structure, the unloading element being adjustably angularly positionable relative to the compacting structure and having a first end, a second end, and an intermediate location disposed generally between the first and second ends, the first end being located adjacent to the open end of the chamber in position for receiving a mass of compacted cotton from the chamber thereon and the second end being opposite the first end, the unloading element further including a first surface portion and a second surface portion, the first surface portion extending between the first end and the intermediate location and the second surface portion extending between the intermediate location and the second end, the first surface portion including a first cotton driver extending therealong and the second surface portion including a second cotton driver extending therealong; and an unloader control, including apparatus for selectably operating the first cotton driver in an unloading direction for moving a mass of compacted cotton over the first surface portion away from the chamber, and apparatus operable during operation of the first cotton driver for detecting passage of a trailing end of a mass of compacted cotton from the first surface portion and automatically stopping the operation of the first cotton driver in the unloading direction so as to limit loose cotton following the mass of compacted cotton on the first surface portion from passing to the second surface portion, the control preventing resumption of operation of the first cotton driver in the unloading direction until a predetermined condition is present indicative of return of a substantial amount of any loose cotton on the first surface portion to the chamber.

21. The unloader of claim 20, wherein the apparatus operable during the operation of the first cotton driver for detecting passage of the trailing end of the mass of compacted cotton from the first surface portion comprises a pressure sensitive device operable for distinguishing between a pressure corresponding to presence of a mass of compacted cotton and a pressure corresponding to presence of loose cotton.

22. The unloader of claim 20, wherein the apparatus operable during operation of the first cotton driver for detecting passage of a trailing end of a mass of compacted cotton from the first surface portion comprises a switch which contacts a mass of compacted cotton when passing from the first surface portion to the second surface portion, the switch changing from a first operating state to a second operating state when contact with the trailing end of the mass of compacted cotton is broken.

23. The unloader of claim 20 wherein the unloader control includes a processor and circuitry connected to the apparatus for operating the first cotton driver and to the apparatus for detecting passage of a trailing end of a mass of compacted cotton, the processor being operable for controlling the apparatus for stopping the operation of the first cotton driver and preventing resumption of operation of the first cotton driver in the unloading direction, and the processor being further operable for controlling the apparatus for operating the first cotton driver to resume the operation thereof when the predetermined condition indicative of return of loose cotton on the first surface portion to the chamber is present.

24. The unloader of claim 20 wherein the first cotton driver comprises a drag chain.

25. The unloader of claim 20 wherein the second cotton driver comprises a drag chain.

26. A control for an unloader of a cotton compacting apparatus, comprising:

an unloader mounted to a compacting apparatus, the unloader being adjustably angularly positionable relative to the compacting apparatus;

a first driver located on the unloader, the first driver controllably operable for moving a compacted mass of cotton from the cotton compacting apparatus over a surface of the unloader to a first location spaced from the apparatus;

a second driver located on the unloader, the second driver controllably operable for moving the compacted mass of cotton from the first location to an end of the unloader opposite the apparatus;

a device positioned and operable for determining passage of a trailing end of the compacted mass from the first location toward the end of the unloader and changing a condition to indicate the passage; and a processor and circuitry for controllably operating the first driver and the second driver, respectively, the processor and the circuitry being operable when the changed condition is present to stop the operation of the first driver for preventing loose cotton on the unloader adjacent the trailing end of the compacted mass from moving past the first location such that the loose cotton can be subsequently returned to the apparatus, the processor and the circuitry preventing resumption of operation of the first driver until a predetermined condition indicative of the return of the loose cotton to the apparatus is present.

27. The control of claim 26 wherein the device positioned and operable for determining passage of the trailing end of the compacted mass from the first location toward the end of the unloader and changing a condition to indicate the passage comprises a contact switch.

28. The control of claim 26 wherein the device positioned and operable for determining passage of the trailing end of the compacted mass from the first location toward the end of the unloader and changing a condition to indicate the passage comprises an optical detector.

29. The control of claim 26 further comprising a device positioned and operable for determining presence of a leading end of the compacted mass at or near the end of the unloader and generating a signal indicative of the presence.

30. The control of claim 26 wherein the device positioned and operable for determining passage of a trailing end of the compacted mass from the first location and changing a condition to indicate the passage comprises a device operable for counting an elapsed time of operation of the first driver or a number of rotations of the first driver.

31. A method of operation of an unloader for removing a compacted mass of cotton from a cotton compacting apparatus, comprising the steps of:

providing an unloader, the unloader being mounted to a cotton compacting apparatus and adjustably angularly positionable relative thereto; providing a first driver, the first driver located on the unloader and controllably operable for moving a compacted mass of cotton from the apparatus over the surface of the unloader to a first location spaced from the apparatus;

providing a second driver, the second driver located on the unloader and controllably operable for moving the compacted mass of cotton from the first location to an end of the unloader opposite the apparatus;

providing a device positioned and operable for determining when the compacted mass of cotton has passed from the first location and changing a predetermined condition representative thereof; and when the changed predetermined condition is present, stopping the operation of the first driver to limit movement by the first driver of loose cotton from the apparatus past the first location while allowing operation of the second driver, and preventing resumption of the operation of the first driver for moving cotton away from the apparatus until a predetermined condition representative of return of loose cotton present on the unloader to the apparatus is present.

* * * * *